US010158414B2

(12) United States Patent
Nam et al.

(10) Patent No.: US 10,158,414 B2
(45) Date of Patent: Dec. 18, 2018

(54) ADVANCED BEAMFORMING AND FEEDBACK METHODS FOR MIMO WIRELESS COMMUNICATION SYSTEMS

(71) Applicant: Samsung Electronics Co., Ltd, Suwon-si (KR)

(72) Inventors: Young-Han Nam, Plano, TX (US); Keonkook Lee, Seoul (KR); Md. Saifur Rahman, Richardson, TX (US); Eko Onggosanusi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/183,587

(22) Filed: Jun. 15, 2016

(65) Prior Publication Data
US 2016/0373178 A1 Dec. 22, 2016

Related U.S. Application Data

(60) Provisional application No. 62/181,564, filed on Jun. 18, 2015, provisional application No. 62/191,319, filed on Jul. 11, 2015, provisional application No. 62/194,117, filed on Jul. 17, 2015, provisional application No. 62/195,061, filed on Jul. 21, 2015, (Continued)

(51) Int. Cl.
*H04B 7/06* (2006.01)
*H04B 7/0456* (2017.01)

(52) U.S. Cl.
CPC ......... *H04B 7/0639* (2013.01); *H04B 7/0469* (2013.01); *H04B 7/0486* (2013.01); *H04B 7/0645* (2013.01)

(58) Field of Classification Search
CPC .. H04B 7/0617; H04B 7/0639; H04B 7/0626; H04B 7/0645; H04B 7/0469; H04B 7/0486
See application file for complete search history.

(56) References Cited

U.S. PATENT DOCUMENTS

2014/0003395 A1 1/2014 Hsu et al.
2014/0078919 A1 3/2014 Hammarwall
(Continued)

OTHER PUBLICATIONS

ETSI TS 136 211 V12.5.0 (Apr. 2015) LTE; Evolved Universal Terrestrial Radio Access (E-UTRA); Physical channels and modulation (3GPP TS 36.211 version 12.5.0 Release 12) Apr. 2015—139 Pages.
(Continued)

*Primary Examiner* — Tejis Daya

(57) ABSTRACT

A user equipment (UE) capable of communicating with a base station (BS) includes a transceiver configured to receive a signal comprising a CSI process configuration, wherein the CSI process configuration comprises a CSI-RS resource configuration to identify a CSI-RS resource and a CSI-RS on the CSI-RS resource, and transmit a precoding matrix indicator to the base station, and a controller configured to derive the precoding matrix indicator utilizing the CSI-RS on the CSI-RS resource. When the CSI-RS resource configuration indicates 4 CSI-RS ports: the precoding matrix indicator has a 3-bit size when a rank to derive the precoding matrix indicator is one; the precoding matrix indicator has a 3-bit size when the rank is two; the precoding matrix indicator has a 2-bit size when the rank is three; and the precoding matrix indicator has a 1-bit size when the rank is four.

20 Claims, 14 Drawing Sheets

Related U.S. Application Data provisional application No. 62/197,908, filed on Jul. 28, 2015.

(56) References Cited

U.S. PATENT DOCUMENTS

2014/0086084 A1     3/2014   Bi et al.
2015/0036652 A1     2/2015   Lee et al.

OTHER PUBLICATIONS

ETSI TS 136 212 V12.4.0 (Apr. 2015) LTE; Evolved Universal Terrestrial Radio Access (E-UTRA); Multiplexing and channel coding (3GPP TS 36.212 version 12.4.0 Release 12)—Apr. 2015—96 Pages.
ETSI TS 136 213 V12.5.0 (Apr. 2015) LTE; Evolved Universal Terrestrial Radio Access (E-UTRA); Physical layer procedures (3GPP TS 36.213 version 12.5.0 Release 12)—Apr. 2015—242 Pages.
The International Searching Authority, "International Search Report," International Application No. PCT/KR2016/006541, dated Sep. 22, 2016, 3 pages, publisher The ISA/KR, International Application Division, Korean Intellectual Property Office, Daejeon, Republic of Korea.

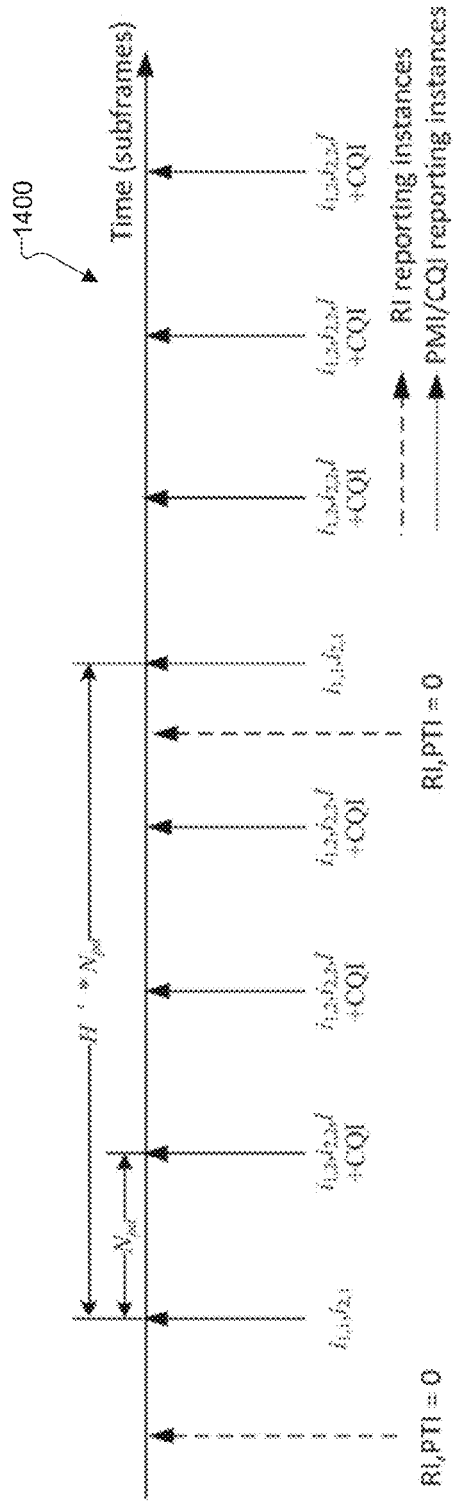
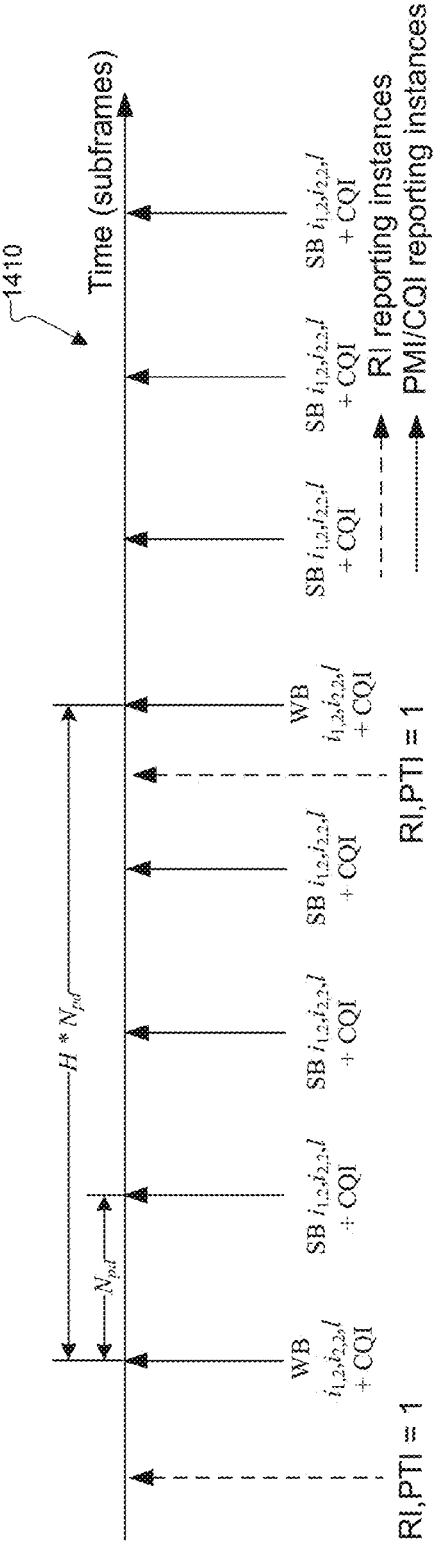
FIGURE 14A
FIGURE 14B

ADVANCED BEAMFORMING AND
FEEDBACK METHODS FOR MIMO
WIRELESS COMMUNICATION SYSTEMS

CROSS-REFERENCE TO RELATED
APPLICATION AND CLAIMS OF PRIORITY

This application claims priority under 35 U.S.C. § 119(e) to: U.S. Provisional Patent Application No. 62/181,564 filed on Jun. 18, 2015; U.S. Provisional Patent Application No. 62/191,319 filed on Jul. 11, 2015; U.S. Provisional Patent Application No. 62/194,117 filed on Jul. 17, 2015; U.S. Provisional Patent Application No. 62/195,061 filed on Jul. 21, 2015; and U.S. Provisional Patent Application No. 62/197,908 filed on Jul. 28, 2015. The above-identified provisional patent applications are hereby incorporated by reference in their entirety.

TECHNICAL FIELD

The present disclosure relates generally to a codebook design and structure associated with a two dimensional transmit antenna array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to a pre-5th-Generation (5G) or 5G communication system to be provided for supporting higher data rates Beyond 4th-Generation (4G) communication system such as Long Term Evolution (LTE).

In a first embodiment, a user equipment (UE) capable of communicating with a base station (BS) is provided. The UE includes a transceiver configured to receive a signal comprising a CSI process configuration, wherein the CSI process configuration comprises a CSI-RS resource configuration to identify a CSI-RS resource and a CSI-RS on the CSI-RS resource, and, and transmit a precoding matrix indicator to the base station, and a controller configured to derive the precoding matrix indicator utilizing the CSI-RS on the CSI-RS resource, wherein when the CSI-RS resource configuration indicates 4 CSI-RS ports: the precoding matrix indicator has a 3-bit size when a rank to derive the precoding matrix indicator is one (1); the precoding matrix indicator has a 3-bit size when the rank is two (2); the precoding matrix indicator has a 2-bit size when the rank is three (3); and the precoding matrix indicator has a 1-bit size when the rank is four (4); and wherein when the CSI-RS resource configuration indicates 8 CSI-RS ports: the precoding matrix indicator has a 4-bit size when the rank to derive the precoding matrix indicator is one (1); and the precoding matrix indicator has a 4-bit size when the rank is two (2).

In a second embodiment, a base station capable of communicating with a user equipment (UE) is provided. The base station includes a transmitter configured to transmit a signal comprising a CSI process configuration, wherein the CSI process configuration comprises a CSI-RS resource configuration to indicate a CSI-RS resource carrying a CSI-RS; a receiver configured to receive a CSI feedback comprising a precoding matrix indicator derived based on the at least one CSI-RS carried on at least one CSI-RS resource, wherein when the CSI-RS resource configuration indicates 4 CSI-RS ports: the precoding matrix indicator has a 3-bit size when a rank to derive the precoding matrix indicator is one (1); the precoding matrix indicator has a 3-bit size when the rank is two (2); the precoding matrix indicator has a 2-bit size when the rank is three (3); and the precoding matrix indicator has a 1-bit size when the rank is four (4); and wherein when the CSI-RS resource configuration indicates 8 CSI-RS ports: the precoding matrix indicator has a 4-bit size when the rank to derive the precoding matrix indicator is one (1); and the precoding matrix indicator has a 4-bit size when the rank is two (2), and a controller configured to identify a precoder matrix according to a codebook based on the CSI feedback.

In a third embodiment, a method for communicating with a base station (BS) is provided. The method includes receiving a signal comprising a CSI process configuration, wherein the CSI process configuration comprises a CSI-RS resource configuration to identify a CSI-RS resource and a CSI-RS on the CSI-RS resource; and deriving the precoding matrix indicator utilizing the CSI-RS on the CSI-RS resource, wherein when the CSI-RS resource configuration indicates 4 CSI-RS ports: the precoding matrix indicator has a 3-bit size when a rank to derive the precoding matrix indicator is one (1); the precoding matrix indicator has a 3-bit size when the rank is two (2); the precoding matrix indicator has a 2-bit size when the rank of CSI-RS is three (3); and the precoding matrix indicator has a 1-bit size when the rank of CSI-RS is four (4); and transmitting a precoding matrix indicator to the BS.

In a fourth embodiment, a method for communicating with a user equipment (UE) is provided. The method includes transmitting a signal comprising a CSI process configuration, wherein the CSI process configuration comprises a CSI-RS resource configuration to indicate a CSI-RS resource carrying a CSI-RS; receiving a CSI feedback comprising a precoding matrix indicator derived based on the at least one CSI-RS carried on at least one CSI-RS resource, wherein when the CSI-RS resource configuration indicates 4 CSI-RS ports: the precoding matrix indicator has a 3-bit size when a rank to derive the precoding matrix indicator is one (1); the precoding matrix indicator has a 3-bit size when the rank is two (2); the precoding matrix indicator has a 2-bit size when the rank is three (3); and the precoding matrix indicator has a 1-bit size when the rank is four (4); and wherein when the CSI-RS resource configuration indicates 8 CSI-RS ports: the precoding matrix indicator has a 4-bit size when the rank to derive the precoding matrix indicator is one (1); and the precoding matrix indicator has a 4-bit size when the rank is two (2), identifying a precoder matrix according to a codebook based on the CSI feedback.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 14A and 14B illustrate PUCCH feedback mode 2-1 according to the embodiments of the present disclosure;

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: (1) 3rd generation partnership project 3GPP TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
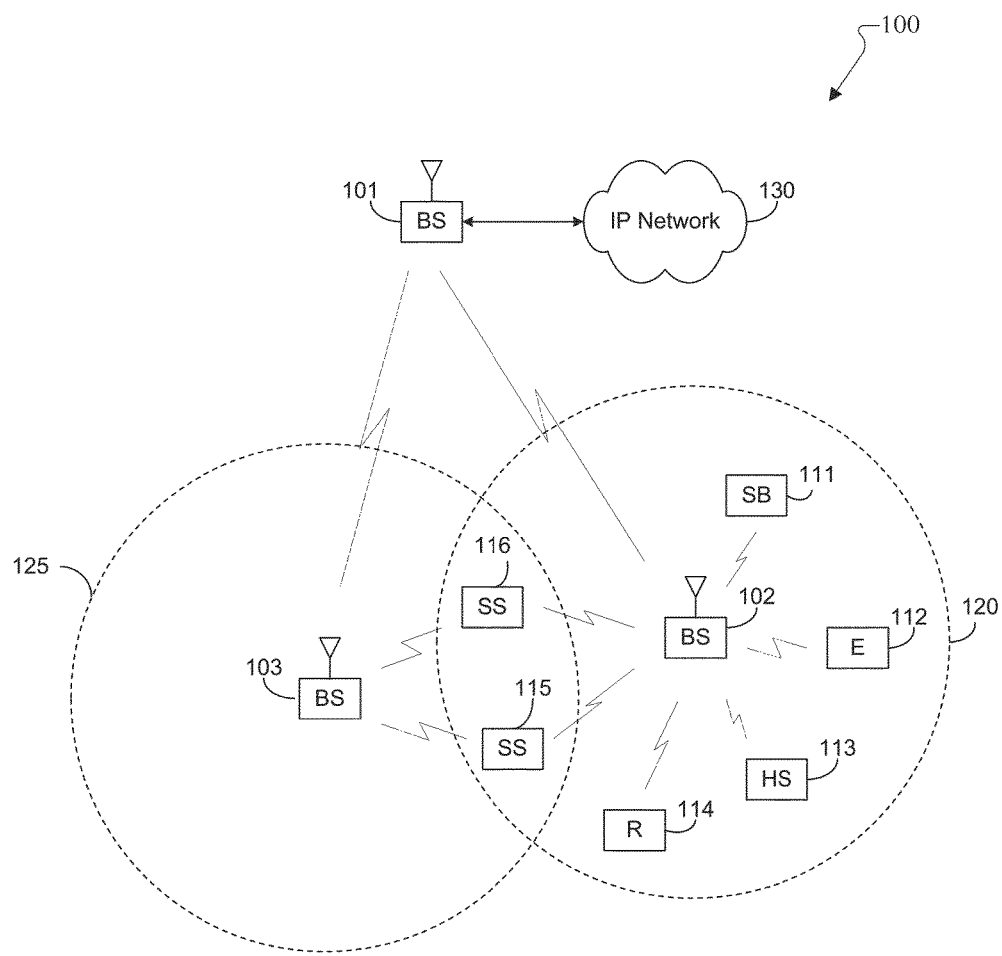
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
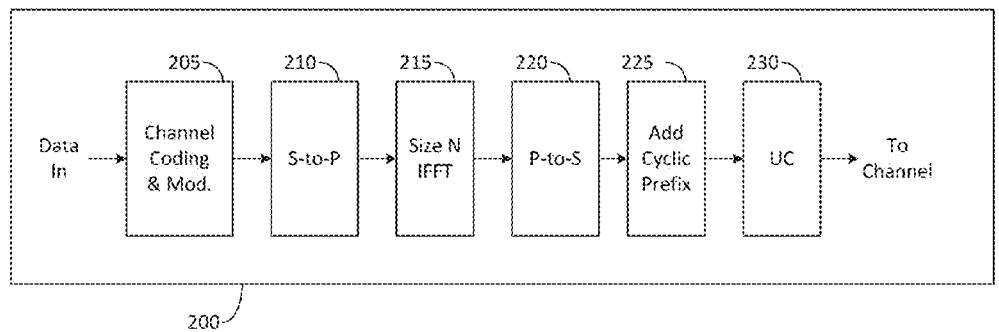
FIGS. 2A and 2B illustrate example wireless transmit and receive paths according to this disclosure.
Figure 2B:
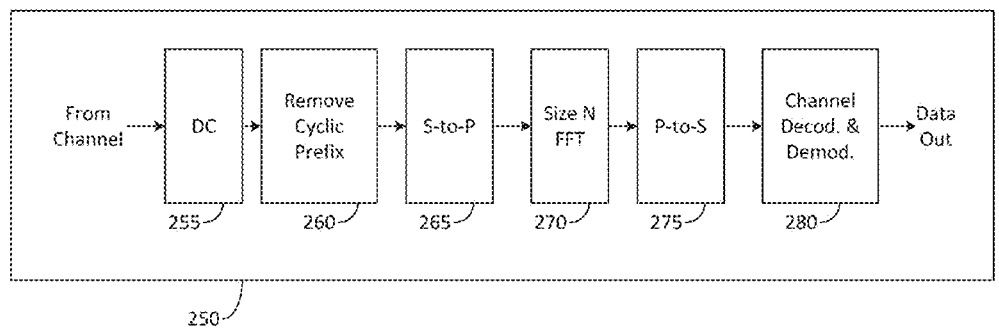

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
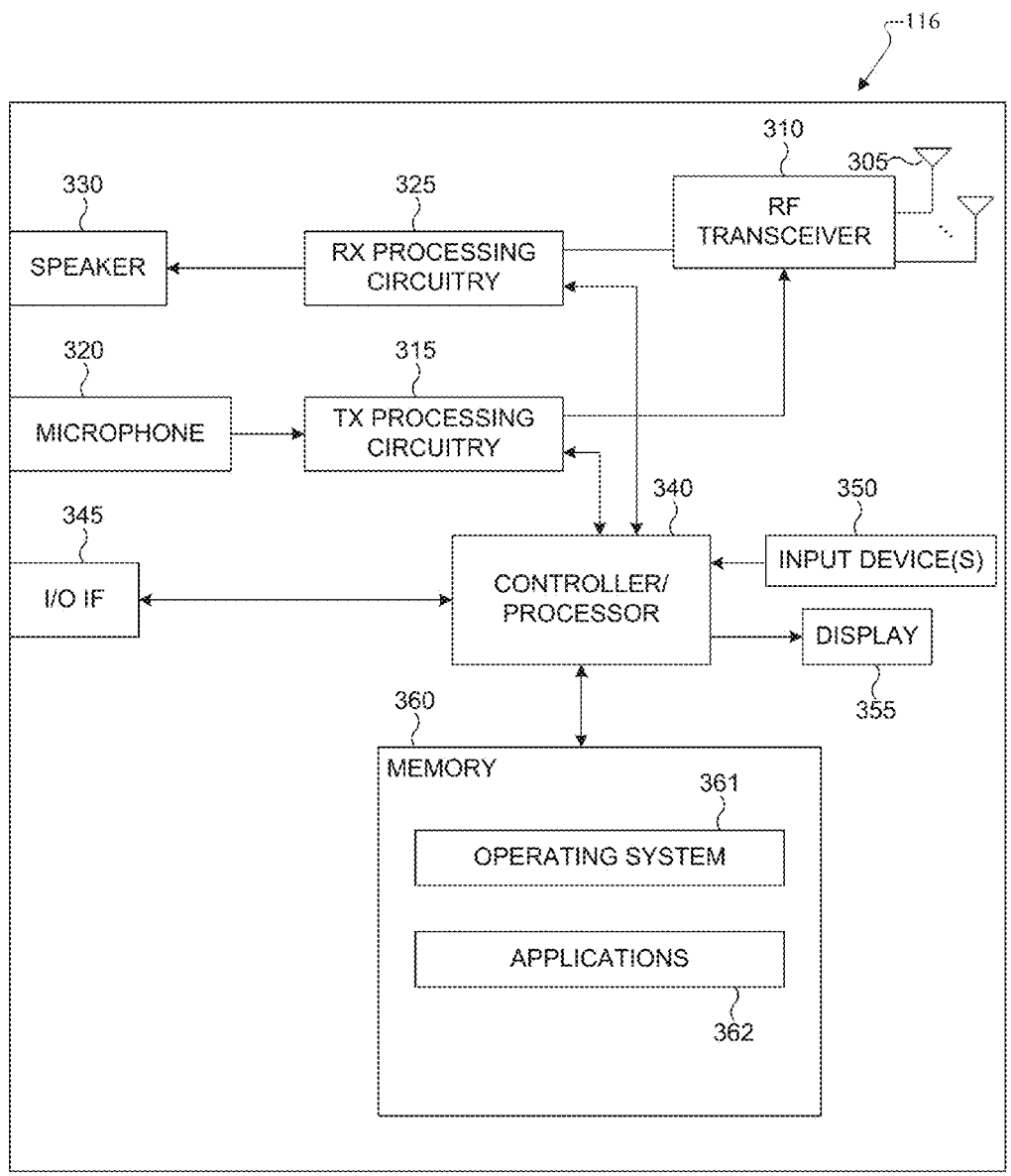
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
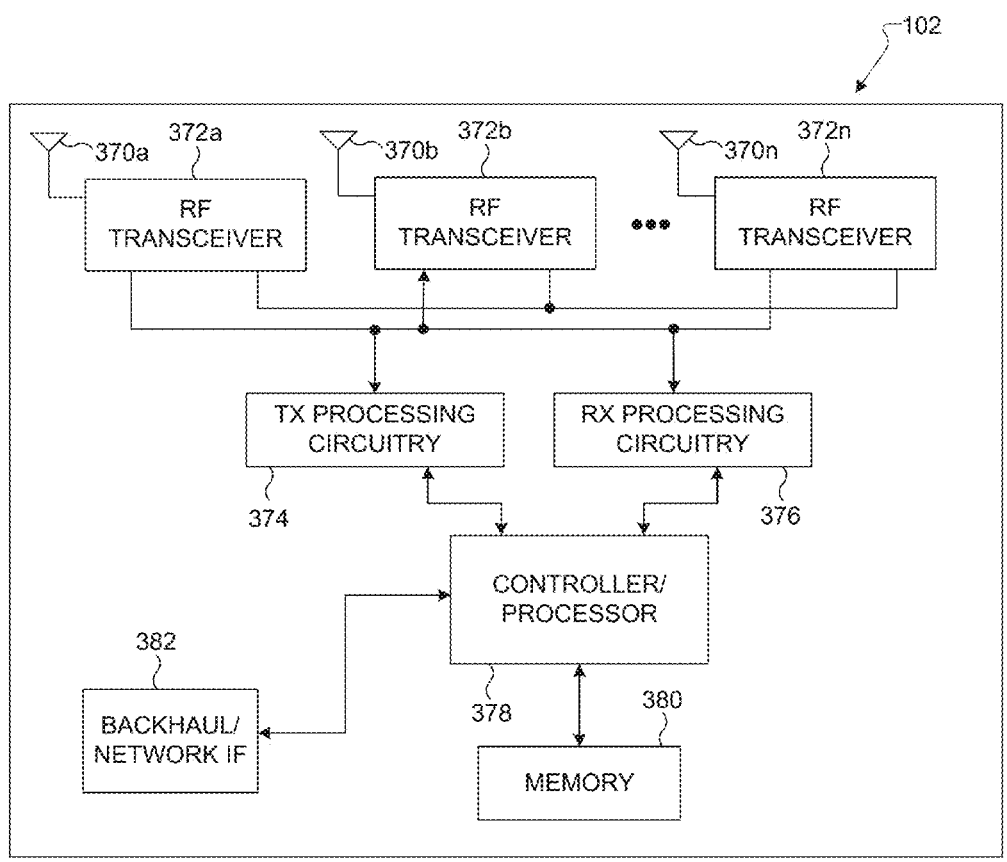
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Logical Port to Antenna Port Mapping

Figure 4:
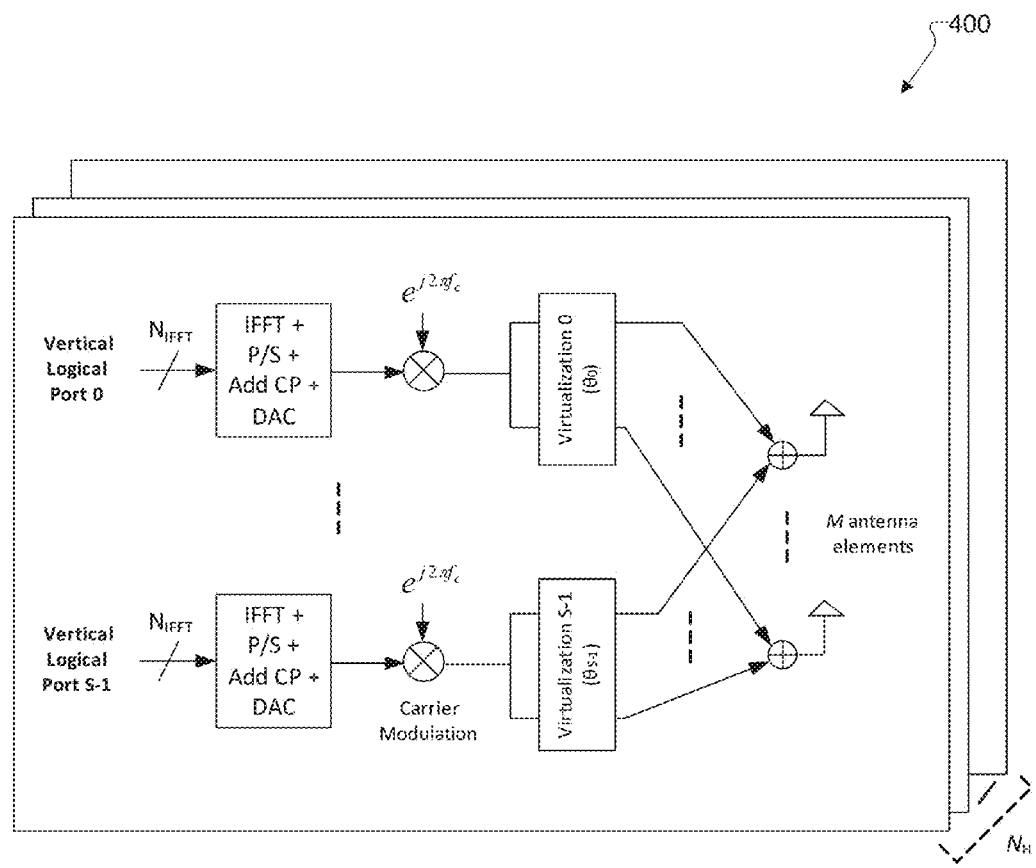
FIG. 4 illustrates logical port to antenna port mapping 400 that may be employed within the wireless communication system according to some embodiments of the current disclosure.

FIG. 4 illustrates logical port to antenna port mapping 400 that may be employed within the wireless communication system according to some embodiments of the current disclosure. The embodiment of the port mapping illustrated in FIG. 4 is for illustration only. However, port mappings come in a wide variety of configurations, and FIG. 4 does not limit the scope of this disclosure to any particular implementation of a port mapping.

FIG. 4 illustrates logical port to antenna port mapping 400, according to some embodiments of the current disclosure. In the figure, Tx signals on each logical port is fed into an antenna virtualization matrix (e.g., of a size Mx1), output signals of which are fed into a set of M physical antenna ports. In some embodiments, M corresponds to a total number or quantity of antenna elements on a substantially vertical axis. In some embodiments, M corresponds to a ratio of a total number or quantity of antenna elements to S, on a substantially vertical axis, wherein M and S are chosen to be a positive integer.

Figure 5A:
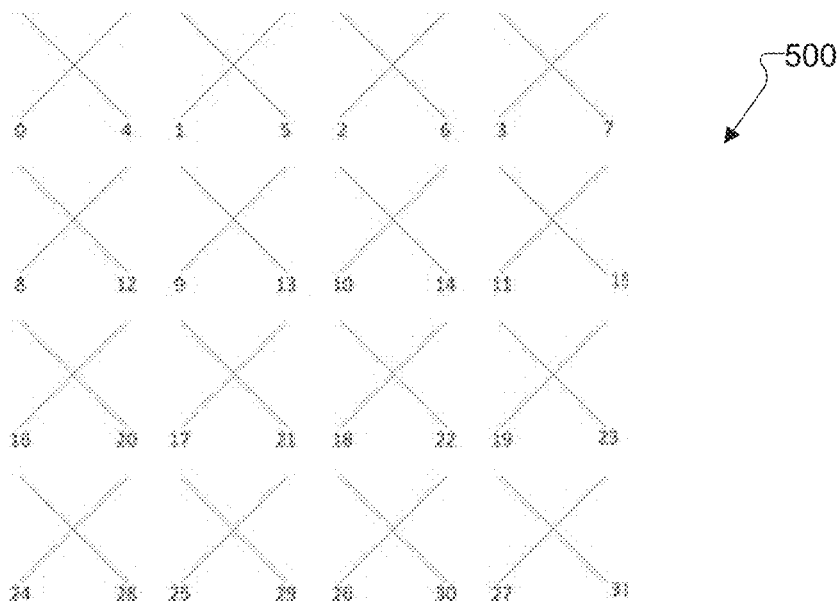
FIG. 5A illustrates a 4×4 dual-polarized antenna array 500 with antenna port (AP) indexing 1 and FIG. 5B is the same 4×4 dual-polarized antenna array 510 with antenna port indexing (AP) indexing 2.
Figure 5B:
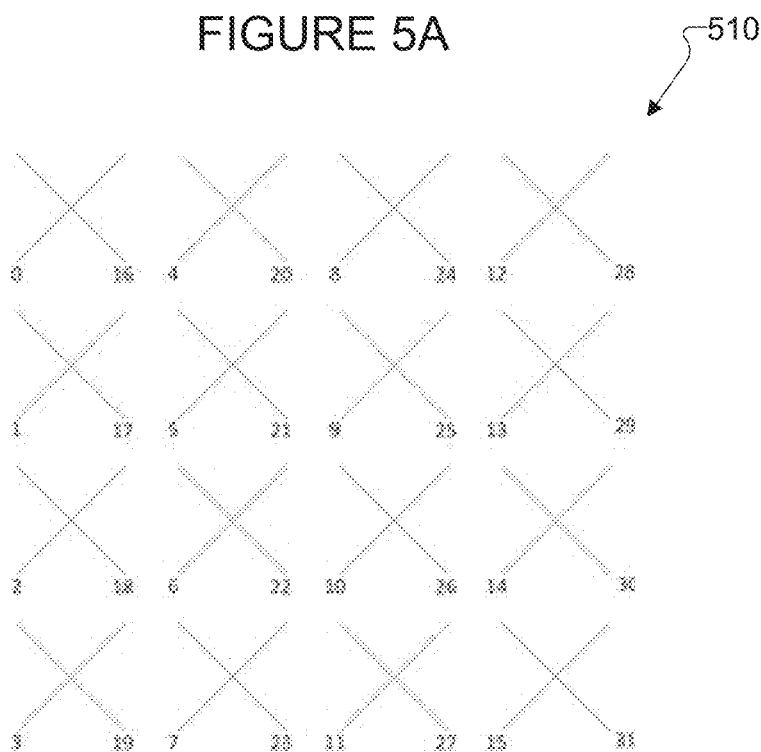

FIG. 5A illustrates a 4×4 dual-polarized antenna array 500 with antenna port (AP) indexing 1 and FIG. 5B is the same 4×4 dual-polarized antenna array 510 with antenna port indexing (AP) indexing 2.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel. 12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 6:
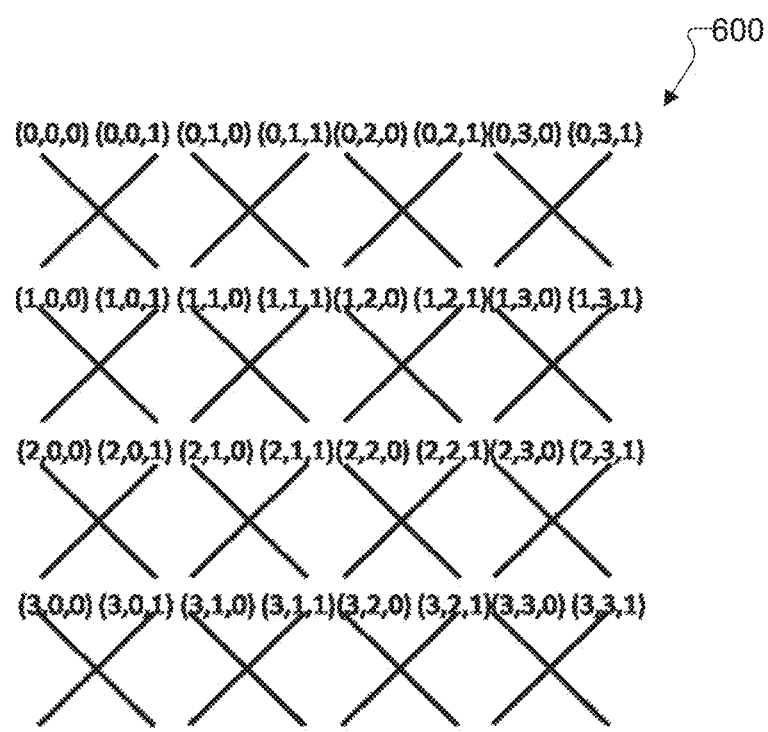
FIG. 6 illustrates numbering of TX antenna elements (or TXRU) on a dual-polarized antenna array 600.

FIG. 6 illustrates another numbering of TX antenna elements (or TXRU) on an dual-polarized antenna array 600 according to embodiments of the present disclosure. The embodiment shown in FIG. 6 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . M−1, n=0, . . . , N−1, p=0, . . . , P−1, as illustrated in FIG. 6 with M=N=4. When the example shown in FIG. 6 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 6. In later embodiments, (M,N) is sometimes denoted as ($N_H$, $N_V$) or ($N_1$, $N_2$).

In some embodiments, a UE is configured with a CSI-RS resource comprising Q=MNP number of CSI-RS ports, wherein the CSI-RS resource is associated with MNP number of resource elements (REs) in a pair of PRBs in a subframe.

CSI-RS and CSI Feedback Configuration

In some embodiments, a UE is configured with a CSI-RS configuration via higher layer, configuring Q antenna ports—antenna ports A(1) through A(Q). The UE is further configured with CSI reporting configuration via higher layer in association with the CSI-RS configuration.

The CSI reporting configuration includes information element (IE) indicating the CSI-RS decomposition information (or component PMI port configuration). The information element may comprise at least two integers, say $N_1$ and $N_2$, which respectively indicates a first number of antenna ports for a first dimension, and a second number of antenna ports for a second dimension, wherein $Q=N_1 \cdot N_2$.

One example method of indicating the CSI-RS decomposition (or component PMI port configuration) is described below.

| | |
|---|---|
| CSIRS decomposition information or Component PMI port configuration | When $Q = 8$, $(N_1, N_2) \in \{(2, 4), (4, 2)\}$. <br> When $Q = 16$, $(N_1, N_2) \in \{(2, 8), (4, 4), (8, 2)\}$. <br> When $Q = 32$, $(N_1, N_2) \in \{(8, 4), (4, 8)\}$. |

Another example method of indicating the PMI reporting decomposition is to explicitly configure Q and $N_1$, and implicitly configure $N_2$.

| | |
|---|---|
| Component PMI port configuration | $Q$ ... positive even number, e.g., selected from $\{1, 2, 4, \ldots, 32\}$ <br> $N_1$ ... positive even number, e.g., selected from $\{1, 2, 4, \ldots, 16\}$ <br> $N_2 = Q/N_1$ ... implicitly derived out of explicitly configured N and $N_1$. |

Another example method of indicating the PMI reporting decomposition is to explicitly configure $N_1$ and $N_2$, and implicitly configure Q.

| | |
|---|---|
| Component PMI port configuration | $N_1$ ... positive even number, e.g., selected from $\{1, 2, 4, \ldots, 16\}$ <br> $N_2$ ... positive even number, e.g., selected from $\{1, 2, 4, \ldots, 16\}$ <br> $Q = N_1 \cdot N_2$ ... implicitly derived out of explicitly configured $N_1$ and $N_2$. |

Another example method of indicating the PMI reporting decomposition is to explicitly configure M, N, and P, and implicitly configure Q.

| | |
|---|---|
| Component PMI port configuration | M ... positive even number, e.g., selected from $\{1, 2, 4, \ldots, 16\}$ <br> N ... positive even number, e.g., selected from $\{1, 2, 4, \ldots, 16\}$ <br> P ... either 1 or 2 <br> $Q = M \cdot N \cdot P$ ... implicitly derived out of explicitly configured M, N, and P. |

In one method, either $W_1$ or $W_2$ is further decomposed according to the double codebook structure. For example, W is further decomposed into:

When the UE is configured with $(N_1, N_2)$, the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank)) is the (column wise) Kronecker product of the two, $W=W_1 \otimes W_2$. If PMI reporting is configured, the UE will report at least two component PMI corresponding to selected pair of $W_1$ and $W_2$.

$$W_1(n, m) = \frac{1}{p_1} \begin{bmatrix} v_m \\ \varphi_n v_m \end{bmatrix}$$

if rank 1; and $$W_1(n, m, m') = \frac{1}{p_2} \begin{bmatrix} v_m & v_{m'} \\ \varphi_n v_m & -\varphi_n v_{m'} \end{bmatrix}$$

if rank 2,
wherein $p_1$ and $p_2$ are normalization factors to make total transmission power 1, $v_m$ is an m-th DFT vector out of a $(N_1/2)$-Tx DFT codebook with oversampling factor $o_1$, and $\varphi_n$ is a co-phase. Furthermore, the index m, m', n determines the precoder $W_1$.

If the transmission rank is one (or number of transmission layers is one), then CQI will be derived with $$W = W_1 \otimes W_2 = \frac{1}{p_1} \begin{bmatrix} v_m \otimes W_2 \\ \varphi_n v_m \otimes W_2 \end{bmatrix};$$

and if the transmission rank is two, then CQI will be derived with $$W = W_1 \otimes W_2 |_{columnwiseKP} = \frac{1}{p_2} \begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In some embodiments, a UE is configured with a CSI-RS configuration via higher layer, configuring two resources, wherein a first resource is used for CSI-RS transmissions of $N_1$ antenna ports—antenna ports $A(1)$ through $A(N_1)$, and a second resource is used for CSI-RS transmissions of $N_2$ antenna ports—antenna ports $B(1)$ through $B(N_2)$.

When the UE is configured with $(N_1, N_2)$, the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank), wherein $P=N_1 \cdot N_2$) is the Kronecker product of the two, $W=W_1 \otimes W_2$. If PMI reporting is configured, the UE will report two component PMI corresponding to selected pair of $W_1$ and $W_2$. The signals formed with the composite precoder are assumed to be transmitted on antenna ports $C(1), \ldots, C(P)$ for the purpose of deriving CQI index. The UE may also assume that reference signals on antenna ports $C(1), \ldots, C(P)$ are constructed by a Kronecker product of reference signals on $A(1), \ldots, A(N_1)$ and reference signals on $B(1), \ldots, B(N_2)$. In other words:

$[C(1), \ldots, C(P)]^t = [A(1), \ldots, A(N_1)]^t \otimes [B(1), \ldots, B(N_2)]^t$.

Relation of Composite Precoder to Antenna Ports

In some embodiments, for the purpose of deriving CQI index, and PMI and RI (if configured), the UE may assume the following:

The PDSCH signals on antenna ports $\{7, \ldots, 6+v\}$ would result in signals equivalent to corresponding symbols transmitted on antenna ports $\{15, \ldots, 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i) = [x^{(0)}(i) \ldots x^{(v-1)}(i)]^T$ is a vector of symbols from the layer mapping in subclause 6.3.3.2 of 3GPPTS36.211, P is the number of antenna ports of the associated CSI-RS resource, and if P=1, W(i) is 1, otherwise W(i), of size P×v, is the precoding matrix corresponding to the reported PMI applicable to x(i). The corresponding PDSCH signals transmitted on antenna ports {15 . . . 14+P} would have a ratio of EPRE to CSI-RS EPRE equal to the ratio given in subclause 3GPPTS36.213.

8-Tx Double Codebook

Table 1 and Table 2 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$\varphi = e^{j\pi n/2}$ $v_m = [1 \; e^{j2\pi m/32} \; e^{j4\pi m/32} \; e^{j6\pi m/32}]^T$.

TABLE 1

Codebook for 1-layer CSI reporting using antenna ports 15 to 22

| | $i_2$ | | | |
|---|---|---|---|---|
| $i_1$ | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |

| | $i_2$ | | | |
|---|---|---|---|---|
| $i_1$ | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | |
|---|---|---|---|---|
| $i_1$ | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| | $i_2$ | | | |
|---|---|---|---|---|
| $i_1$ | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$, If the most recently reported RI=1, m and n are derived with the two indices $i_1$ and $i_2$ according to Table 1, resulting in a rank-1 precoder, $$W_{m,n}^{(1)} = \frac{1}{\sqrt{8}} \begin{bmatrix} v_m \\ \varphi_n v_m \end{bmatrix}.$$

TABLE 2

Codebook for 2-layer CSI reporting using antenna ports 15 to 22

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+2i_1+1,0}^{(2)}$ | $W_{2i_1+1,2i_1+1,1}^{(2)}$ |

| | $i_2$ | | | |
|---|---|---|---|---|
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 2-continued

Codebook for 2-layer CSI reporting using antenna ports 15 to 22

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ If the most recently reported RI=2, m, m' and n are derived with the two indices $i_1$ and $i_2$ according to Table 2, resulting in a rank-2 precoder, $$W_{m,m',n}^{(2)} = \frac{1}{4} \begin{bmatrix} v_m & v_{m'} \\ \varphi_n v_m & -\varphi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m', or the same beams ($v_m$) are used for constructing the rank-2 precoder:

$$W_{m,m,n}^{(2)} = \frac{1}{4} \begin{bmatrix} v_m & v_m \\ \varphi_n v_m & -\varphi_n v_m \end{bmatrix}.$$

In this case, the two columns in the 2-layer precoder are orthogonal (i.e., $[v_m \; \varphi_n v_m]^H \cdot [v_m \; -\varphi_n v_m] = 0$), owing to the different signs applied to $\varphi_n$ for the two columns. These rank-2 precoders are likely to be used for those UEs that can receive strong signals along two orthogonal channels generated by the two differently polarized antennas.

Figure 7:
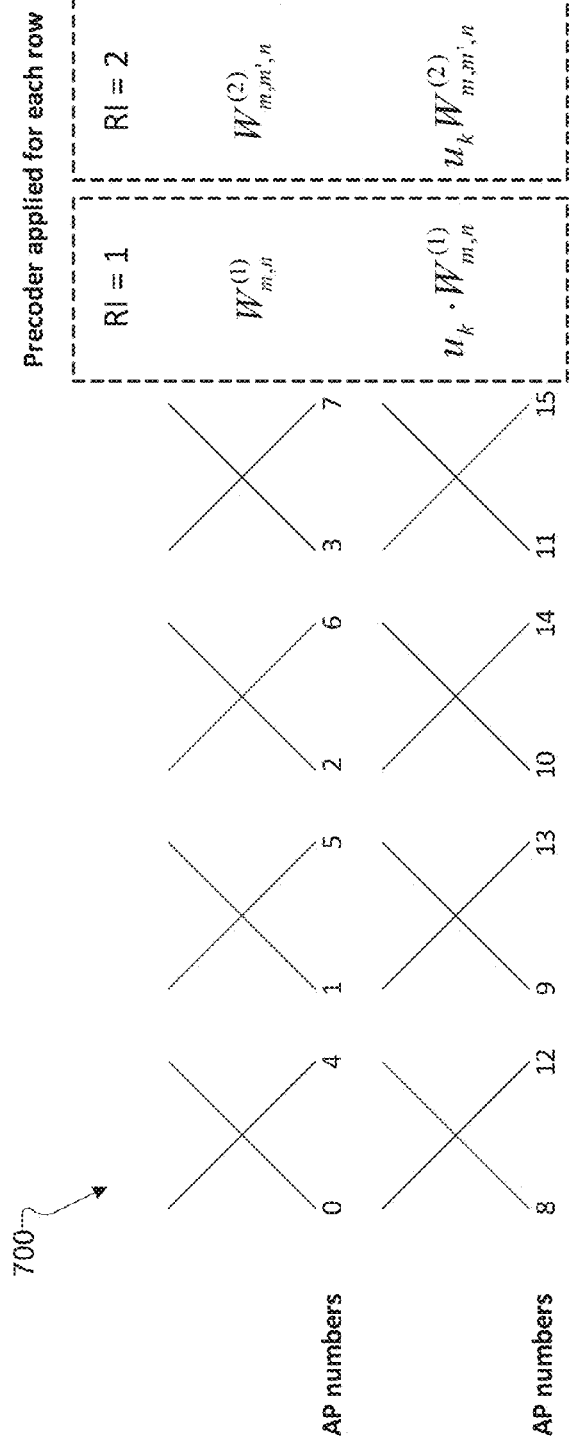
FIG. 7 illustrates a new codebook construction 700 constructed for P=16 antenna ports comprising N1=8 and N2=2 according to some embodiments of the present disclosure.

FIG. 7 illustrates a new codebook construction 700 constructed for P=16 antenna ports comprising $N_1=8$ and $N_2=2$ according to some embodiments of the present disclosure. For each group of APs corresponding to each row (i.e., {0, 1, . . . 7} and {8, 9, . . . , 15}, the channels are quantized with two indices $i_1$ and $i_2$, according to the 8-Tx double codebook. It is noted that the antenna (TXRU) numbering system in this example is aligned with FIG. 5A.

A co-phasing vector to apply for the two rows is constructed with a new index k, and is equal to $$V_k^{(1)} = \frac{1}{\sqrt{2}} \begin{bmatrix} 1 \\ u_k \end{bmatrix}.$$

The resulting precoders $W_{m,n,k}^{(1)}$ and $W_{m,m',n,k}^{(2)}$ when the most recently reported RI is 1 and 2 are:

$$W_{m,n,k}^{(1)} = \frac{1}{\sqrt{2}} \begin{bmatrix} W_{m,n}^{(1)} \\ u_k W_{m,n}^{(1)} \end{bmatrix}$$

if RI=1;

$$W_{m,m',n,k}^{(2)} = \frac{1}{\sqrt{2}} \begin{bmatrix} W_{m,m',n}^{(2)} \\ u_k W_{m,m',n}^{(2)} \end{bmatrix}$$

if RI=2.

It is noted that the precoders when the most recently reported RI is >2 can also be similarly constructed with applying a co-phasing vector.

Case 1. (RI=1) Substituting $$W_{m,n}^{(1)} = \frac{1}{\sqrt{8}} \begin{bmatrix} v_m \\ \varphi_n v_m \end{bmatrix}$$

to $$W_{m,n,k}^{(1)} = \frac{1}{\sqrt{2}} \begin{bmatrix} W_{m,n}^{(1)} \\ u_k W_{m,n}^{(1)} \end{bmatrix},$$

we obtain:

$$W_{m,n,k}^{(1)} (= V_k^{(1)} \otimes W_{m,n}^{(1)}) = \frac{1}{\sqrt{2}} \begin{bmatrix} W_{m,n}^{(1)} \\ u_k W_{m,n}^{(1)} \end{bmatrix} = \frac{1}{4} \begin{bmatrix} v_m \\ \varphi_n v_m \\ u_k v_m \\ \varphi_n u_k v_m \end{bmatrix}.$$

Case 2. (RI=2) Substituting $$W_{m,m',n}^{(2)} = \frac{1}{4} \begin{bmatrix} v_m & v_{m'} \\ \varphi_n v_m & -\varphi_n v_{m'} \end{bmatrix}$$

to $$W_{m,m',n,k}^{(2)} = \frac{1}{\sqrt{2}} \begin{bmatrix} W_{m,m',n}^{(2)} \\ u_k W_{m,m',n}^{(2)} \end{bmatrix},$$

we obtain:

$$W_{m,m',n,k}^{(2)} (= V_k^{(1)} \otimes W_{m,m',n}^{(2)}) =$$

$$\frac{1}{\sqrt{2}} \begin{bmatrix} W_{m,m',n}^{(2)} \\ u_k W_{m,m',n}^{(2)} \end{bmatrix} = \frac{1}{\sqrt{32}} \begin{bmatrix} v_m & v_{m'} \\ \varphi_n v_m & -\varphi_n v_{m'} \\ u_k v_m & u_k v_{m'} \\ \varphi_n u_k v_m & -\varphi_n u_k v_{m'} \end{bmatrix},$$

where it is clarified that $W_{m,m',n,k}^{(2)}$ is indeed a Kronecker product of $V_k^{(1)}$ and $W_{m,m',n}^{(2)}$.

In one method, $u_k = e^{j \pi k/2}$, k=0, 1, 2, 3, which is uniformly sampling the range of [0, 2π]. In this case, the rank-1 and rank-2 precoders are constructed as:

$$W_{m,n,k}^{(1)} = \frac{1}{4} \begin{bmatrix} v_m \\ e^{\frac{j\pi n}{2}} v_m \\ e^{\frac{j\pi k}{2}} v_m \\ e^{\frac{j\pi(n+k)}{2}} v_m \end{bmatrix} \text{ and } W_{m,m',n,k}^{(2)} = \frac{1}{\sqrt{32}} \begin{bmatrix} v_m & v_{m'} \\ e^{\frac{j\pi n}{2}} v_m & -e^{\frac{j\pi n}{2}} v_{m'} \\ e^{\frac{j\pi k}{2}} v_m & e^{\frac{j\pi k}{2}} v_{m'} \\ e^{\frac{j\pi(n+k)}{2}} v_m & -e^{\frac{j\pi(n+k)}{2}} v_{m'} \end{bmatrix}.$$

PMI Feedback Indices

A UE can be configured to report three PMI indices, $i_1$, $i_2$, and $i_3$, for informing eNB of m, m', n, k, used for constructing a precoder according to a codebook construction associated with FIG. 4. In one method, $i_1$, $i_2$ correspond to precoders $W_{m,n,k}^{(1)}$ and $W_{m,m',n}^{(2)}$ according to the relation in Table 1 and Table 2 respectively for the cases of RI=1 and RI=2; and $i_3$ is mapped to k according to relation of k=$i_3$. In this case, $i_3$ is mapped to a vertical precoder ($V_k^{(1)}$), according to the following table, with $u_k = e^{j \pi k/4}$, k=0, 1, 2, 3.

TABLE 2

Third PMI to Vertical precoder mapping

| $i_3$ | 0 | 1 | 2 | 3 |
|---|---|---|---|---|
| $V_k^{(1)}$ | $\frac{1}{\sqrt{2}}\begin{bmatrix}1\\1\end{bmatrix}$ | $\frac{1}{\sqrt{2}}\begin{bmatrix}1\\j\end{bmatrix}$ | $\frac{1}{\sqrt{2}}\begin{bmatrix}1\\-1\end{bmatrix}$ | $\frac{1}{\sqrt{2}}\begin{bmatrix}1\\-j\end{bmatrix}$ |

As k=$i_3$ is essentially a vertical beam index, which does not change quickly over time and frequency. Hence, it is proposed to jointly feedback $i_1$ and $i_3$ in PUCCH feedback modes.

In some embodiments, a UE is configured with a beamformed CSI-RS resource, and the UE is configured to report a beam index corresponding to a CSI-RS in place of a vertical precoder ($V_k^{(1)}$). In this case, the third PMI $i_3$ is mapped to a beam index. The beam index may correspond to a CSI-RS port index, a CSI process index or a CSI-RS resource index.

Some examples for mapping $i_3$ to a beam index (an antenna port index) are illustrated in Table 4.

In one method, A=15, in which case, beamformed CSI-RS port numbers are 15, 16, . . . , 22. In another method, a new set of antenna port numbers are assigned for beamformed CSI-RS, e.g., A=200.

TABLE 3

Third PMI to CSI-RS port index mapping

| | | $i_3$ | 0 | 1 | 2 | 3 |
|---|---|---|---|---|---|---|
| Example 1. Selected CSI-RS port index when 4 port beamformed CSI-RS is configured | | | A | A + 1 | A + 2 | A + 3 |
| Example 2. Selected pair of CSI-RS port index when 8 port beamformed CSI-RS is configured | Alt 1 (APs P, P + 4 are with the same beam) | | A, A + 4 | A + 1, A + 5 | A + 2, A + 6 | A + 3, A + 7 |
| | Alt 2 (A pair of ports with two adjacent AP numbers are with the same beam) | | A, A + 1 | A + 2, A + 3 | A + 4, A + 5 | A + 6, A + 7 |

TABLE 3-continued

Third PMI to CSI-RS port index mapping

| | $i_3$ | 0 | 1 | 2 | 3 |
|---|---|---|---|---|---|
| Example 3. Selected pair of CSI-RS port index when 4 port beamformed CSI-RS is configured | Alt 1 (APs P, P + 2 are with the same beam) Alt 2 (A pair of ports with two adjacent AP numbers are with the same beam) | A, A + 2 A, A + 1 | A + 1, A + 2 A + 2, A + 3 | Reserved or N/A | |

In one method of Example 3, $i_3=2$ or 3 is reserved, in which case, a UE would still report 2-bit PMI for $i_3$, but the UE does not choose $i_3=2$ or 3. In another method of Ex 3, the UE would report 1-bit PMI for $i_3$.

Some examples for mapping $i_3$ to a beam index (a CSI-RS resource index or a CSI process index) are illustrated in Table 5.

TABLE 5

Third PMI to CSI-RS resource (or CSI process) index mapping

| $i_3$ | 0 | 1 | 2 | 3 |
|---|---|---|---|---|
| Ex. 4 | A first resource (or process) index configured by higher layers | A second resource (or process) index configured by higher layers | A third resource (or process) index configured by higher layers | A fourth resource (or process) index configured by higher layers |
| Ex. 5 | 0 | 1 | 2 | 3 |

In Example 4, the four resource indices corresponding to $i_3=0, 1, 2, 3$ are configured in the higher layer. In Example 5, the four resource indices are hard-coded as 0, 1, 2 and 3.

In these examples (i.e., Example 4 and Example 5), it is assumed that 4 beamformed CSI-RS resources (or CSI processes) are configured. The higher layers can be RRC layer.

It is noted that these tables are just for illustration, and other straightforward combinations related to other numbers of CSI-RS ports (CSI-RS resources, or CSI processes) can also be similarly constructed according to the current disclosure.

The number of information bits corresponding to the third PMI may be determined dependent upon the number of configured CSI-RS ports in a beamformed CSI-RS resource, the number of configured CSI-RS resources, or the number of configured CSI processes.

In some embodiments, a UE is configured to determine which mapping table of $i_3$ the UE would use for a CSI reporting, based upon a condition.

In one method, the condition is determined based upon a new parameter, which indicates whether the associated CSI-RS for the CSI reporting is beamformed or non-precoded: when the new parameter indicates that the CSI-RS is beamformed, the UE uses a mapping table to map $i_3$ to a beam index (example tables are Table 4 and Table 5); and/or when the new parameter indicates that the CSI-RS is non-precoded, the UE uses a mapping table to map $i_3$ to a vertical precoder (an example table is Table 3).

The new parameter may be configured as an optional parameter in each CSI process configuration.

Figure 8:
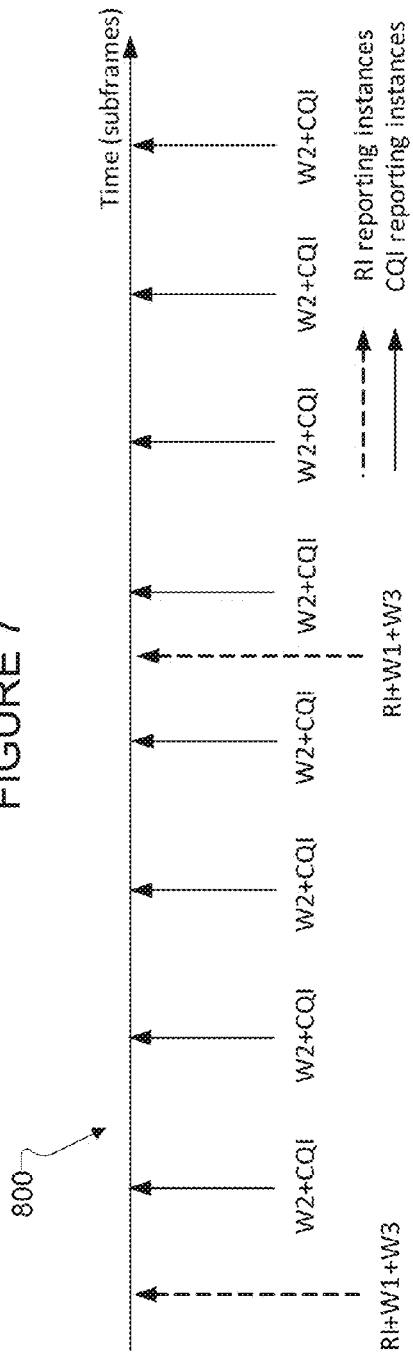
FIG. 8 illustrates that a UE is configured with a design of PUCCH feedback mode 1-1, according to some embodiments of the present disclosure.

FIG. 8 illustrates that a UE is configured with PUCCH feedback mode 1-1 submode 1 800, according to one embodiment of the present disclosure. In FIG. 8, $i_1$, $i_2$ and $i_3$ are denoted as W1, W2 and W3. Then, the UE reports RI, $i_1$ and $i_3$ in RI reporting instances, and the UE reports $i_2$ and corresponding CQI in PMI/CQI reporting instances.

A baseline approach to multiplex RI, $i_1$ and $i_3$ is to subsample $i_1$ according to the legacy specification, and not to subsample $i_3$. In this case, the resulting mapping table from PMI $I_{RI/PMI1/PMI3}$ to $i_1$ and $i_3$ may look like the below table 6 (up to RI 1 and 2).

TABLE 6

Mapping table from PMI $I_{RI/PMI1/PMI3}$ to $i_1$ and $i_3$

| Value of joint encoding of RI and the first PMI $I_{RI/PMI1/PMI3}$ | RI | Codebook index $i_1$ | Codebook index $i_3$ |
|---|---|---|---|
| 0-7 | 1 | $2I_{RI/PMI1/PMI3}$ | 0 |
| 8-15 | 1 | $2(I_{RI/PMI1/PMI3} - 8)$ | 1 |
| 16-23 | 1 | $2(I_{RI/PMI1/PMI3} - 16)$ | 2 |
| 24-31 | 1 | $2(I_{RI/PMI1/PMI3} - 24)$ | 3 |
| 32-39 | 2 | $2(I_{RI/PMI1/PMI3} - 32)$ | 0 |
| 40-47 | 2 | $2(I_{RI/PMI1/PMI3} - 40)$ | 1 |
| 48-55 | 2 | $2(I_{RI/PMI1/PMI3} - 48)$ | 2 |
| 56-63 | 2 | $2(I_{RI/PMI1/PMI3} - 56)$ | 3 |

In this case, number of bits to encode $I_{RI/PMI1/PMI3}$ with RI=1 and 2 becomes as large as 6 bits; and number of bits to encode $I_{RI/PMI1/PMI3}$ with RI=1, 2, . . . , 8 will become 7 bits with extending the Rel-10 table in a similar manner. Although 6-7 bit payload can be transmitted on PUCCH format 2a/2b, a potential issue is reception reliability. As $I_{RI/PMI1/PMI3}$ information is used over multiple subsequent reporting instances, the lower reception reliability may eventually result in lower DL throughput.

Figure 9:
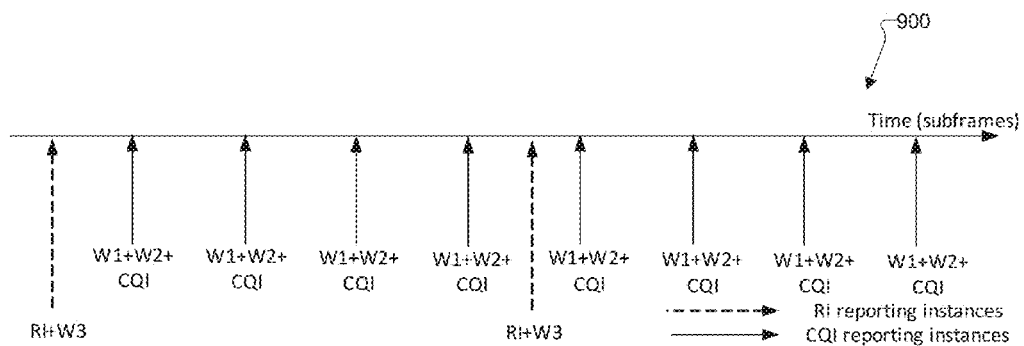
FIG. 9 illustrates a design of PUCCH feedback mode 1-1 according to some embodiments of the present disclosure.

FIG. 9 illustrates a design of PUCCH feedback mode 1-1 according to one embodiment of the present disclosure. A UE, configured with 12 or 16 port NZP CSI-RS, is configured with PUCCH feedback mode 1-1 submode 900. Then, the UE reports RI and $i_3$ in RI reporting instances, and the UE reports $i_1$, $i_2$ and corresponding CQI in PMI/CQI reporting instances. In FIG. 9, where $i_1$, $i_2$ and $i_3$ are denoted as W1, W2 and W3.

In this case, W1+W2+CQI reported in the CQI reporting instances can be reported according to the subsampling method associated with PUCCH mode 1-1 submode 2 in Rel-10 LTE specifications. In addition, RI+W3 can be jointly coded according to the following table 7.

TABLE 7

| | RI | Codebook index $i_3$ |
|---|---|---|
| 0-3 | 1 | $I_{RI/PMI3}$ |
| 4-7 | 2 | $(I_{RI/PMI3} - 4)$ |
| . . . (continues similarly as above) | 3 . . . 7 | . . . (continues similarly as above) |
| 28-31 | 8 | $(I_{RI/PMI3} - 28)$ |

Alternatively, RI and W3 can be separately coded and reported in the RI reporting instances: in this case, RI has 8 possible values, i.e., 1, . . . , 8 and i, has 4 possible values, 0, 1, 2, and 3.

In both cases, the total number of bits to be carried in the RI reporting instances for RI+W3 in this case is 5 bits.

Figure 10:
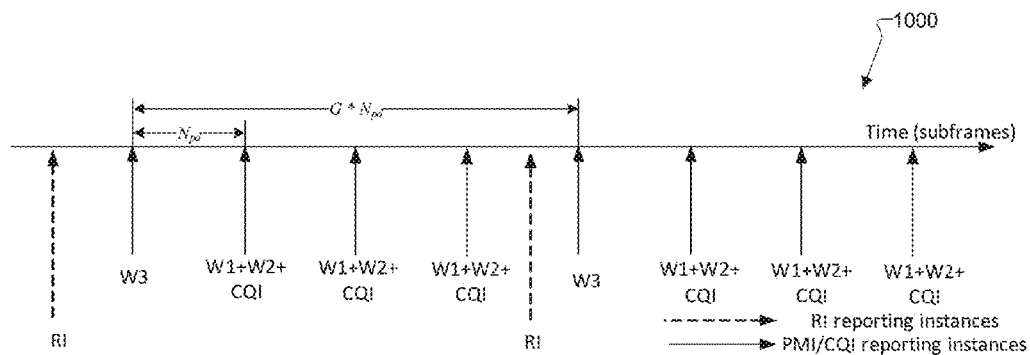
FIG. 10 illustrates a design of PUCCH mode 1-1 according to some embodiments of the present disclosure.

FIG. 10 illustrates a design of PUCCH mode 1-1 1000 according to one embodiment of the present disclosure. A UE, configured with 12 or 16 port NZP CSI-RS, is configured with the design of PUCCH feedback mode 1-1. Then, the UE reports RI in the RI reporting instances. Suppose further that the PMI/CQI reporting instances are with duty cycle of $N_{pd}$ subframes. Then the UE reports $i_3$ in a first set of PMI/CQI reporting instances with duty cycle of $G \cdot N_{pd}$ subframes and ($i_1$, $i_2$ and corresponding CQI) in the rest PMI/CQI reporting instances where G is a positive integer configured in the higher layer. In the FIG. 10, $i_1$, $i_2$ and $i_3$ are denoted as W1, W2 and W3. In this case, W1+W2+CQI reported in the CQI reporting instances can be reported according to the subsampling method associated with PUCCH mode 1-1 submode 2 in Rel-10 LTE specifications.

This submode provides the most reliable reception of W3 and RI information at the eNB among those submodes considered in this disclosure. One drawback of this approach is that one PMI/CQI reporting instance is exclusively used for W3 transmission, and hence the particular reporting instance cannot be used for CQI reporting.

Figure 11:
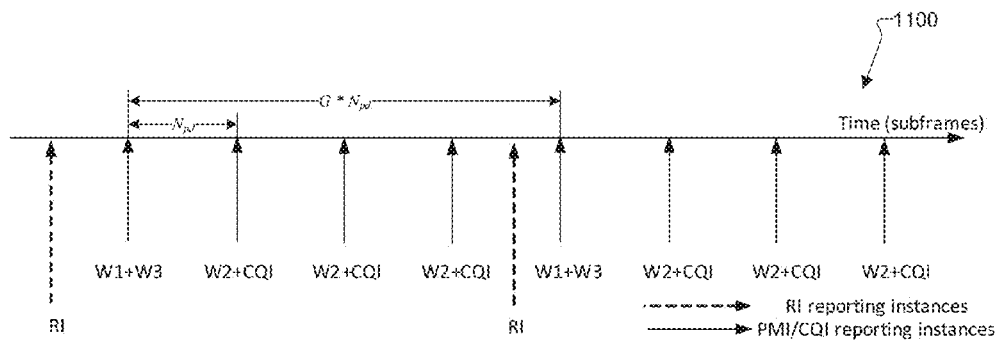
FIG. 11 illustrates a design of PUCCH mode 1-1 according to some embodiments of the present disclosure.

FIG. 11 illustrates a design of PUCCH mode 1-1 1100 according to one embodiments of the present disclosure. A UE, configured with 12 or 16 port NZP CSI-RS, is configured with the PUCCH feedback mode 1-1. Then, the UE reports RI in the RI reporting instances. Suppose further that the PMI/CQI reporting instances are with duty cycle of $N_{pd}$ subframes. Then the UE reports $i_1$ and $i_3$ in a first set of PMI/CQI reporting instances with duty cycle of $G \cdot N_{pd}$ subframes and ($i_2$ and corresponding CQI) in the rest PMI/CQI reporting instances where G is a positive integer configured in the higher layer. In FIG. 10, where $i_1$, $i_2$ and $i_3$ are denoted as W1, W2 and W3. In this case, W2+CQI reported in the CQI reporting instances can be reported according to the subsampling method associated with PUCCH mode 1-1 submode 2 in Rel-10 LTE specifications.

This submode provides a reasonable reliability for W1+W3 and good reliability for the RI information at the eNB among those submodes considered in this disclosure. One drawback of this approach is that one PMI/CQI reporting instance is exclusively used for W3 transmission, and hence the particular reporting instance cannot be used for CQI reporting.

A Q-Tx Codebook and CSI Reporting Design with General V-PMI

Figure 12:
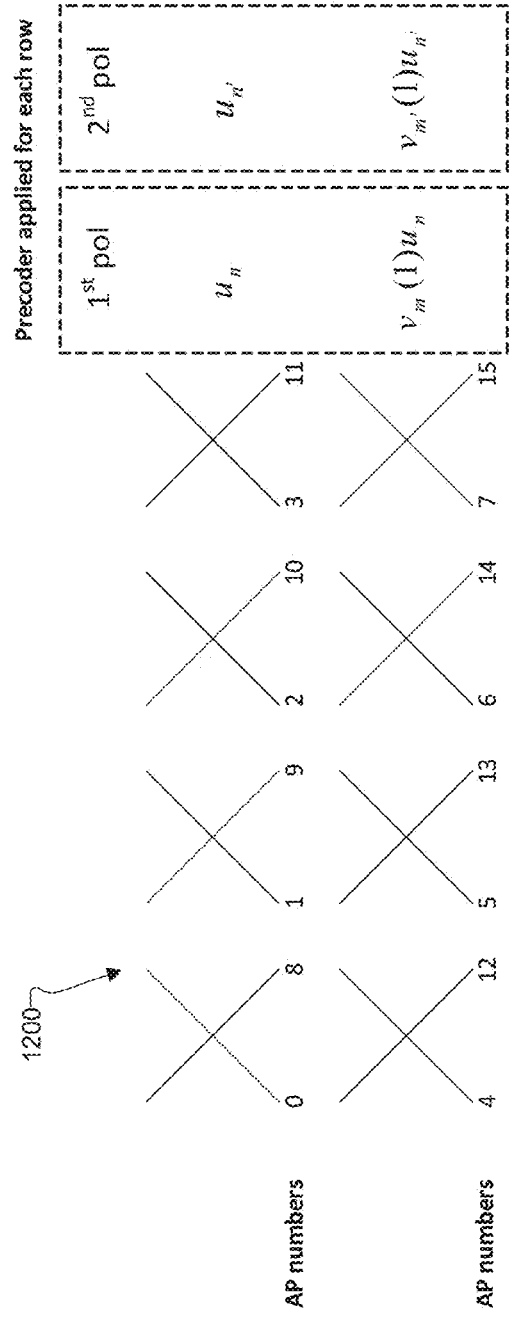
FIG. 12 illustrates a codebook construction according to some embodiments of the present disclosure.

FIG. 12 illustrates a new codebook construction 1200 according to some embodiments of the present disclosure, constructed for P=16 antenna ports. It is noted that the antenna (TXRU) numbering system in this example is aligned with FIG. 5B, with rotating the 2D antenna panel counter-clockwise with 90 degrees.

Suppose that a UE is configured with a CSI process, which configures Q(=MNP)-port CSI-RS, in which M, N and P respectively represent number of rows, columns and polarization as illustrated in FIG. 6.

Suppose further that the UE is configured to report PMI, which indicates a Q-port precoding vector (or matrix if RI>1).

For PMI reporting purpose, the Q-port precoding vector for RI=1 is constructed as:

$$W = \frac{1}{\sqrt{Q}} \begin{bmatrix} v_m^{(M,s_M)} \otimes v_n^{(N,s_N)} \\ \varphi_l v_m^{(M,s_M)} \otimes v_n^{(N,s_N)} \end{bmatrix}$$

if P=2;

$$W = \frac{1}{\sqrt{Q}} v_m^{(M,s_M)} \otimes v_n^{(N,s_N)}$$

if P=1, where $s_M$ and $s_N$ are integers, indicating DFT subsampling factors;

$v_k^{(K,s_K)} = [1 \; e^{j2\pi k/(s_K K)} \; \ldots \; e^{j2\pi k(K-1)/(s_K K)}]^t$; where (a) k=0, 1, ..., $Ks_K$–1, and $s_K$ and K are a positive integer.

In some embodiments, it is proposed that N≥M, i.e., the number of elements (N) of an oversampled DFT vector for the 1$^{st}$ dimension is greater than or equal to the number of elements (M) of an oversampled DFT vector for the 2$^{nd}$ dimension, wherein pairs of (M,N) that can be configured to a UE are (3,2) and (4,2), and the pair is configured by the total number of antenna ports in the corresponding CSI-RS resource. In particular, if total number of antenna ports is 12, (M,N)=(3,2) is configured; if total number of antenna ports is 16, (M,N)=(4,2) is configured.

In each PMI reporting, information regarding either a full set or a subset of indices l, m and n is reported.

In one method, each of m and n is written as:

$n = A_1 i_{1,1} + g(i_{1,2})$ where $A_1$ is an integer, e.g., 1, 2, 4 and $g(\cdot)$ is a function whose output is an integer.

In one example, $f(i_{1,2}) = i_{1,2}$; $i_{1,2}=0, 1$.

$i_{1,1}$, $i_{1,2}$ are denoted as a first and a second PMIs for a first dimension in some embodiments of the present disclosure.

m is denoted as a beam index for the first dimension in some embodiments of the present disclosure.

$m = A_2 i_{2,1} + f(i_{2,2})$, where $A_2$ is an integer, e.g., 1, 2, 4 and $f(\cdot)$ is a function whose output is an integer.

In one example, $f(i_{2,2}) = i_{2,2}$; $i_{2,2}=0, 1$.

$i_{2,1}$, $i_{2,2}$ are denoted as a first and a second PMIs for a second dimension in some embodiments of the present disclosure.

m is denoted as a beam index for the second dimension in some embodiments of the present disclosure.

It is noted that the subscript indexing (i.e., $i_{1,1}$, $i_{1,2}$, $i_{2,1}$, $i_{2,2}$) of the first and the second PMIs on the first and the second dimensions can be done in another manner, without departing from the principles of the current invention. For example, may respectively correspond to the first PMI on the first dimension, the first PMI on the second dimension, the second PMI on the first dimension and the second PMI on the second dimension.

In some embodiments, the first and the second dimensions respectively correspond to the horizontal and the vertical dimension.

In one method, $\varphi_l$ is quantized as QPSK, in which case $$\varphi_l = e^{j\frac{2\pi l}{2}},$$

l=0, 1, 2, 3. l is denoted as a co-phase index in some embodiments of the present disclosure.

In some embodiments, co-phase index l is determined as a function of the second PMI for the first dimension, where the first dimension has an oversampled DFT matrix with larger number of elements than the second dimension. For example, the second PMI $i'_{1,2}$ is used to indicate $i_{1,2}$ and l. One such example indication can be found in Table 10.

Below, with $s_M$=4 and $s_N$=8, three examples are constructed for three different antenna configurations. It is noted that other examples can be similarly constructed with replacing the numbers substituted in these parameters.

Example 1 16 CSI-RS Ports, Four Columns

With (M, N, P)=(2, 4, 2), the two DFT vectors to comprise the Q=16 port precoding vector are:

$$v_m^{(M=2,s_M=4)} = \left[1 \ e^{j\frac{2\pi m}{8}}\right]^t, m = 0, 1, ..., 7; \text{ and}$$

$$v_n^{(N=4,s_N=8)} = \left[1 \ e^{j\frac{2\pi n}{32}} \ e^{j\frac{4\pi n}{32}} \ e^{j\frac{6\pi n}{32}}\right]^t, n = 0, 1, ..., 31.$$

Example 2 12 CSI-RS Ports, Three Columns with (M, N, P)=(2, 3, 2), and the two DFT vectors to comprise the Q=12 port precoding vector are:

$$v_n^{(N=3,s_N=4)} = \left[1 \ e^{j\frac{2\pi n}{12}} \ e^{j\frac{4\pi n}{12}}\right]^t, n = 0, 1, ..., 11; \text{ and}$$

$$v_m^{(M=2,s_M=8)} = \left[1 \ e^{j\frac{2\pi m}{16}}\right]^t, m = 0, 1, ..., 15.$$

Relation Between the PMIs and a Beam Index for the Second Dimension

In some embodiments, the relation between two PMIs $i_{2,1}$ and $i_{2,2}$ (the first and the second PMIs) for the second dimension, and the beam index m for the second dimension is the same, regardless of the configured value of M.

One such example is illustrated in Table 6. This example has an advantage that a same equation is used for deriving the beam index m for the second dimension out of the PMIs $i_{2,1}$ and $i_{2,2}$ for the second dimension: $m=i_{2,1}+i_{2,2}$. In this case, the number of possible values for $i_{2,1}$ may be different dependent upon different choices of M: the numbers are 8, 12 and 16 respectively for M=2, 3, 4 in the example in Table 6. Then, the minimum number of information bits required to convey $i_{2,1}$ is respectively 3, 4, 4 bits for M=2, 3, 4.

In one method, regardless of the configured value of M, a UE is configured to report 4 bit information for $i_{2,1}$, with reserving the unused states. According to this method, UE will have the same payload for $i_{2,1}$, which makes UE implementation simpler.

TABLE 8

Example relation between PMI and beam index m for the second dimension

| M | Relation between vertical PMIs $i_{2,1}$ and $i_{2,2}$, and vertical beam index n | Range of $i_{2,1}$ and $i_{2,2}$ | Number of bits allocated for $i_{2,1}$ | Number of bits allocated for $i_{2,2}$ |
|---|---|---|---|---|
| 2 | $m = i_{2,1} + i_{2,2}$ | $i_{2,1} = 0, 1, ..., 7$ and $i_{2,2} = 0, 1$ | Alt 1: 3 Alt 2: 4 (Out of 16 states, 8 states are mapped to the 8 values of $i_{2,1}$, and the rest 8 states are reserved) | 1 |
| 3 | | $i_{2,1} = 0, 1, ..., 11$ and $i_{2,2} = 0, 1$ | 4 (Out of 16 states, 12 states are mapped to the 12 values of $i_{2,1}$, and the rest 4 states are reserved) | |
| 4 | | $i_{2,1} = 0, 1, ..., 15$ and $i_{2,2} = 0, 1$ | 4 | |

In some embodiments, the relation between two PMIs $i_{1,1}$ and $i_{1,2}$ for the first dimension, and beam index n for the first dimension is determined differently dependent upon the configured value of N.

One such example is illustrated in Table 9. This example has an advantage that a same number of bits is used for quantizing the first PMI $i_{1,1}$ for the first dimension, regardless of the configured value of N. When N=2 is configured, total number of beams for the first dimension is 16, and one out of all the 16 beams are selected with $i_{1,1}=0, 1, ..., 15$. When N=4 is configured, total number of beams for the first dimension is 32, and one out of 16 beams, which comprise uniformly subsampled beams out of the total 32 beams with subsampling factor 2, is selected with $i_{1,1}=0, 1, ..., 15$.

TABLE 9

Example relation between PMI and index n for the first dimension

| N | Relation between the two PMIs $i_{1,1}$ and $i_{1,2}$, and the beam index n for the first dimension | Range of $i_{1,1}$ and $i_{1,2}$ | Number of bits allocated for $i_{1,1}$ | Number of bits allocated for $i_{1,2}$ |
|---|---|---|---|---|
| 2 | $n = i_{1,1} + i_{1,2}$ | $i_{1,1} = 0, 1, ..., 15$ and $i_{1,2} = 0, 1$ | 4 | 1 |
| 4 | $n = 2i_{1,1} + i_{1,2}$ | | | |

In some embodiments, the relation between the two PMIs $i_{1,1}$ and $i_{1,2}$ for the first dimension and the beam index n for the first dimension is the same, regardless of the configured value of N.

One such example is illustrated in Table 10. This example has an advantage that a same equation is used for deriving the beam index n out of the PMIs $i_{1,1}$ and. When N=2 is configured, total number of beams is 16, one out of 8 beams, which comprise uniformly subsampled beams out of the total 16 beams with subsampling factor 2, is selected with $i_{1,1}=0, 1, ..., 7$. When N=4 is configured, total number of beams is 32, and one out of 16 beams, which comprise uniformly subsampled beams out of the total 32 beams with subsampling factor 2, is selected with $i_{1,1}=0, 1, ..., 15$.

TABLE 10

Example relation between PMI and horizontal beam index n

| N | Relation between horizontal PMIs $i_{1,1}$ and $i_{1,2}$, and horizontal beam index n | Range of $i_{1,1}$ and $i_{1,2}$ | Number of bits allocated for $i_{1,1}$ | Number of bits allocated for $i_{1,2}$ |
|---|---|---|---|---|
| 2 | $n = 2i_{1,1} + i_{1,2}$ | $i_{1,1} = 0, 1, ..., 7$ and $i_{1,2} = 0, 1$ | Alt 1: 3 Alt 2: 4 (Out of 16 states, 8 states are mapped to the 8 values of $i_{1,1}$, and the rest 8 states are reserved) | 1 |
| 4 | | $i_{1,1} = 0, 1, ..., 15$ and $i_{1,2} = 0, 1$ | 4 | |

In some embodiments, a UE is configured to report four PMI indices of $i_{1,1}$, $i'_{1,2}$, $i_{2,1}$ and $i_{2,2}$, wherein:

$i_{1,1}$ and $i_{2,1}$ are used to indicate a set of beam indices respectively on the first and the second dimensions;

$i'_{1,2}$ is used to indicate a beam index among the set of beam indices on the first dimension; and co-phase index l; and $i_{2,2}$ is used to indicate a beam index among the set of beam indices on the second dimension.

In some embodiments, a UE is configured to report four or five PMI indices out of the five indices of $i_{1,1}$, $i_{1,2}$ $i_{2,1}$ and $i_{2,2}$, and l, depending upon a condition:

when condition A holds, the UE is configured to report three PMI indices $i_{1,1}$, $i_{1,2}$, l and $i_{2,1}$; and when condition B holds, where condition B can be a complement of condition A, (Alt 1) the UE is configured to report four PMI indices $i_{1,1}$, $i_{1,2}$, $i_{2,1}$ and $i_{2,2}$, and l.

(Alt 2) the UE is configured to report three PMI indices $i_{1,1}$, $i_{1,2}$, l and $i_{2,2}$.

Here, $i_{1,1}$ and $i_{2,1}$ are used to indicate a set of beam indices respectively on the first and the second dimensions; $i_{1,2}$ and $i_{2,2}$ are used to indicate a beam index among the set of beam indices respectively on the first and the second dimension; l is an index to indicate a co-phase factor.

In one method, a UE is configured with a parameter indicating whether the UE should report ST/SB PMI or LT/WB PMI for the second dimension. In one example, condition A corresponds to an event that the configured parameter indicates that the UE should report LT/WB PMI for the second dimension; and condition B corresponds to an event that the configured parameter indicates that the UE should report ST/SB PMI for the second dimension.

In some embodiments, a UE is configured with beam-formed CSI-RS, in which case reporting procedure of a beam index is the same as PMI reporting procedures for the second dimension, devised in some embodiments of the present disclosure.

In one example: when the UE is configured with ST/SB beam index, the UE is configured to report $i_{1,1}$, $i_{1,2}$, l and $i_{2,1}$; and when the UE is configured with LT/WB beam index, the UE is configured to report $i_{1,1}$, $i_{1,2}$, l and $i_{2,2}$.

The PMI reporting can be performed either on PUSCH or on PUCCH, respectively according to aperiodic CSI reporting configuration and periodic CSI reporting configuration. When the PMI reporting is performed on PUSCH, which is triggered by aperiodic CSI trigger carried in a UL grant DCI (DCI format 0 or 4), the UE reports all the PMI indices (either three or four dependent upon the condition) on the PUSCH scheduled by the UL grant DCI. When the PMI reporting is performed on PUCCH, the UE reports a subset of the PMI indices in each PUCCH report.

Figure 13:
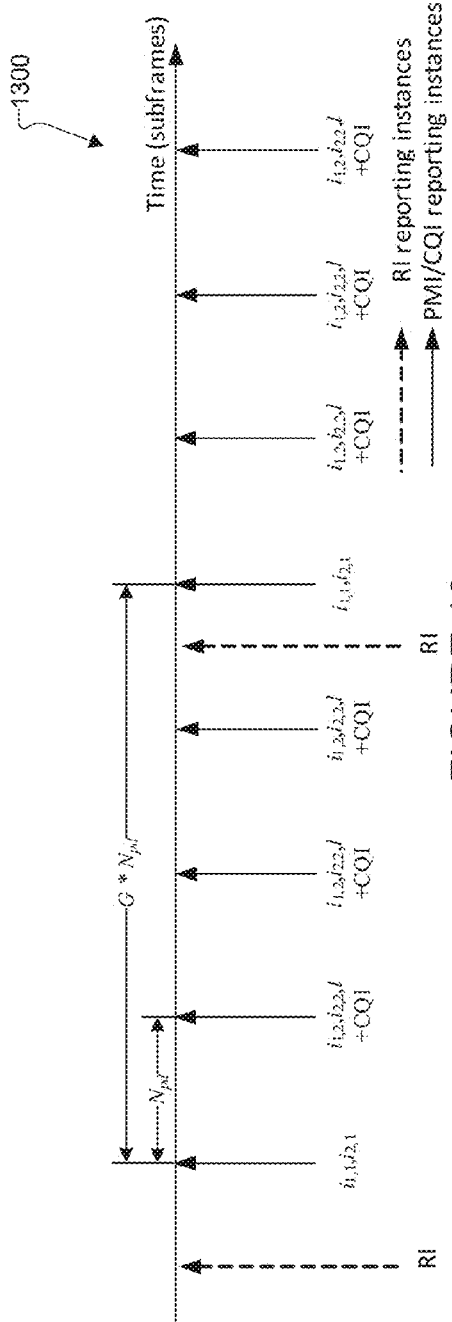
FIG. 13 illustrates a design of PUCCH feedback mode 1-1 according to one embodiments of the present disclosure.
Figure 15:
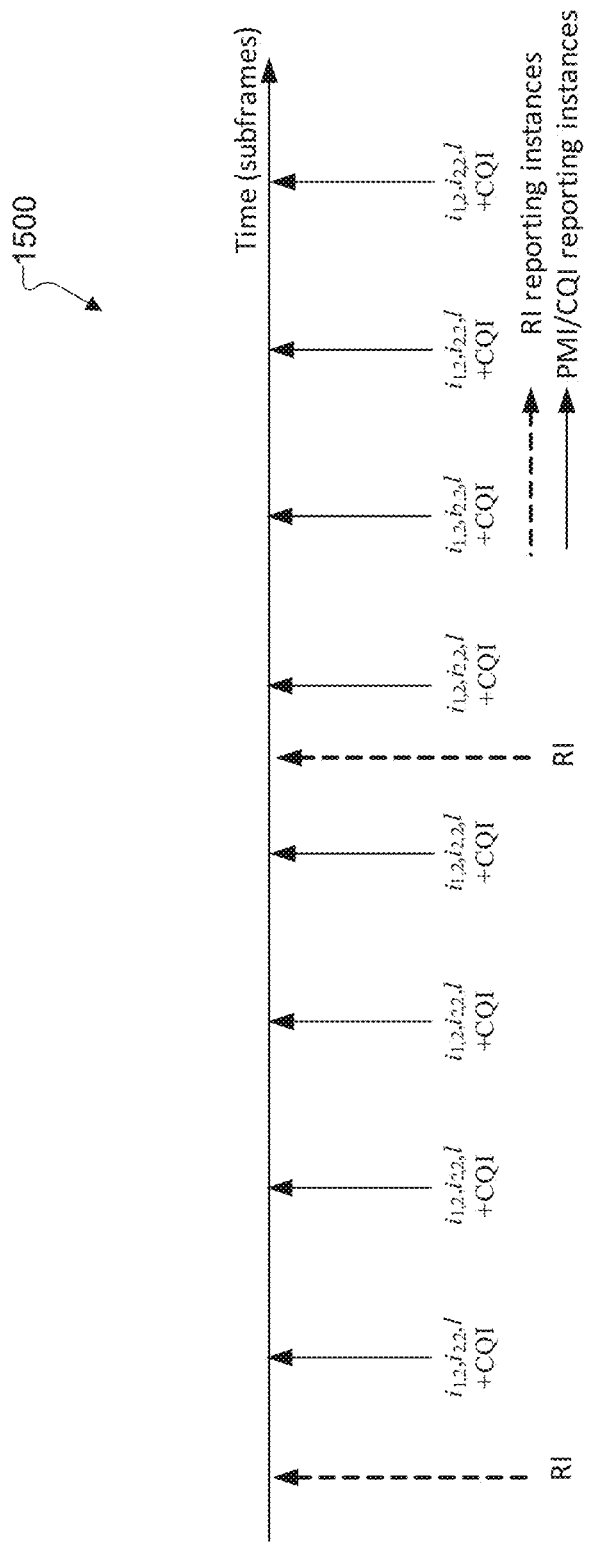
FIG. 15 illustrates a design of PUCCH mode 1-1 with the periodic CSI feedback according to some embodiments of the present disclosure.

FIG. 13 illustrates PUCCH feedback mode 1-1 1300 according to one embodiments of the present disclosure. A UE is configured with PUCCH feedback mode 1-1, wherein the configured number of NZP CSI-RS ports is either 12 or 16. Then, the UE reports RI in the RI reporting instances. Suppose further that the PMI/CQI reporting instances are with duty cycle of $N_{pd}$ subframes ($N_{pd}$ is configured in the higher layer). Then the UE reports $i_{1,1}$ and $i_{2,1}$ first PMIs on the first and the second dimensions), in a first set of PMI/CQI reporting instances with duty cycle of $G \cdot N_{pd}$ subframes and ($i_{1,2}$, $i_{2,2}$, l—the second PMI—and corresponding CQI) or ($i'_{1,2}$ and $i_{2,2}$ in some embodiments) in the rest PMI/CQI reporting instances where G is a positive integer configured in the higher-layer. In an alternative embodiment, in those subframes for reporting $i_{1,1}$ and $i_{2,1}$, a rank-1 CQI is transmitted as well, wherein the CQI is derived with a selected precoding matrix (constructed with the selected $i_{1,1}$ and $i_{2,1}$ (reported together with the CQI), and $i_{1,1}$, $i_{2,2}$, l (not reported in the current subframe)).

In one example, $i_{1,2} \in \{0,1\}$, $i_{2,2} \in \{0,1\}$ and $l \in \{0,1,2,3\}$. Then total number of bits for $i_{1,2}$, $i_{2,2}$ and l is 4 bits, and hence together with 4 or 7 bit CQI, all the information can be multiplexed in a single PUCCH format 2a/2b.

It is noted that the 16 states generated with $i_{1,2} \in \{0,1\}$, $i_{2,2} \in \{0,1\}$ and $l \in \{0,1,2,3\}$ can be mapped from a single or two variables, in some embodiments.

In some embodiments, a UE is configured with PUCCH feedback mode 2-1, wherein the configured number of NZP CSI-RS ports is either 12 or 16. Then, the UE reports RI and PTI in the RI reporting instances. Suppose further that the PMI/CQI reporting instances are with duty cycle of $N_{pd}$ subframes ($N_{pd}$ is configured in the higher layer).

FIGS. 14A and 14B illustrate PUCCH feedback mode 2-1 1400 and 1410 according to the embodiments of the present disclosure.

If the reported PTI=0 as shown in FIG. 14A, then the UE reports $i_{1,1}$ and $i_{2,1}$, in a first set of PMI/CQI reporting instances with duty cycle of $H' \cdot N_{pd}$ subframes; and ($i_{1,2}$, $i_{2,2}$, l and corresponding CQI) or ($i'_{1,2}$ and $i_{2,2}$ in some embodiments) in the rest PMI/CQI reporting instances where H' is a positive integer configured in the higher-layer.

If the reported PTI=1 as shown in FIG. 14B, then the UE reports WB ($i_{1,2}$, $i_{2,2}$, l and corresponding CQI) or ($i'_{1,2}$ and $i_{2,2}$ in some embodiments) in a first set of PMI/CQI reporting instances with duty cycle of $H \cdot N_{pd}$ subframes; and SB ($i_{1,2}$, $i_{2,2}$, l and corresponding CQI) or ($i'_{1,2}$ and $i_{2,2}$ in some embodiments) in the rest PMI/CQI reporting instances where H=J+K−1, J is the number of bandwidth parts and K is a positive integer configured in the higher-layer.

In one method, the UE configured with a beamformed CSI-RS resource with 12 or 16 port CSI-RS can be configured with PUCCH can be configured with PUCCH mode 1-1, in which the UE reports CSI according to the illustration in FIG. 14. In the figure, the UE reports RI in the RI reporting instances, and the UE reports ($i_{1,2}$, $i_{2,2}$ and l) or ($i'_{1,2}$ and $i_{2,2}$ in some embodiments)₂ and CQI in the PMI/CQI reporting instances.

In some embodiments, a UE is configured with a CSI process comprising at least:

Either a first CSI-RS resource for non-precoded CSI-RS or a second CSI-RS resource for beamformed CSI-RS or both;

CSI-IM (or zero-power CSI-RS, or IMR);

Either aperiodic CSI reporting configuration or periodic CSI reporting configuration or both; and Codebook subset restriction configuration.

For the UE configured with such a CSI process, the UE operation to derive CSI reports changes dependent upon whether the first CSI-RS resource or the second CSI-RS resource or both are configured.

When the UE is configured with only the first CSI-RS resource (non-precoded), the UE derives both the long-term CSI (i.e., beam group indication, or the first PMI) and the short-term CSI (i.e., co-phase (and beam selection, when multiple beams configured), or the second PMI and CQI) using CSI-RS on the first CSI resource and the CSI-IM, and reports both the long-term CSI and short-term CSI. Furthermore, if the UE is configured with PUCCH mode 1-1, the periodic CSI feedback on PUCCH is performed according to FIG. 13.

When the UE is configured with only the second CSI-RS resource (beamformed), the UE derives only the short-term CSI (i.e., co-phase (and beam selection) and CQI) using the CSI-IM and CSI-RS on the second CSI-RS resource, and reports only the short-term CSI. Furthermore, if the UE is configured with PUCCH mode 1-1 1500, the periodic CSI feedback on PUCCH is performed according to the legacy specification, e.g., according to FIG. 15.

When the UE is configured with both the first (non-precoded) and the second CSI-RS resource (beamformed), the UE derives: the long-term CSI (i.e., beam group indication, or the first PMI) using CSI-RS on the first CSI-RS resource; and the short-term CSI (i.e., co-phase (and beam selection) and CQI, RI) using the CSI-IM and CSI-RS on the second CSI-RS resource; and reports both the long-term and short-term CSI. Furthermore, if the UE is configured with PUCCH mode 1-1, the periodic CSI feedback on PUCCH is performed according to FIG. 13, wherein $i_{1,1}$ and $i_{2,1}$ derived with the CSI-RS on the first CSI-RS, $(i_{1,2}, i_{2,2}$ and 1) or ($i'_{1,2}$ and $i_{2,2}$ in some embodiments) and CQI are derived with the CSI-RS on the second CSI-RS and IMR.

In some embodiments, when $i_{1,2}$, $i_{2,2}$ and 1 are mapped from a single variable denoted by e.g., $i_2$, a mapping from $i_2$ to these three variables can be defined, and only $i_2$ is reported by the eNB together with the CQI in those CQI/PMI reporting instances. On such example mapping is illustrated in Table 11. It is further noted that similar tables can be straightforwardly constructed with permuting rows and columns, without deviating from the principles of the present disclosure.

TABLE 11

Mapping of $i_{1,2}$, $i_{2,2}$ and 1 from $i_2$

| $i_2$ | $i_{1,2}$ | $i_{2,2}$ | 1 |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 0 | 1 | 0 |
| 5 | 0 | 1 | 1 |
| 6 | 0 | 1 | 2 |
| 7 | 0 | 1 | 3 |
| 8 | 1 | 0 | 0 |
| 9 | 1 | 0 | 1 |
| 10 | 1 | 0 | 2 |
| 11 | 1 | 0 | 3 |
| 12 | 1 | 1 | 0 |
| 13 | 1 | 1 | 1 |
| 14 | 1 | 1 | 2 |
| 15 | 1 | 1 | 3 |

When they are mapped from two variables denoted by e.g., $i'_{1,2}$ and $i_{2,2}$, and a mapping from $(i_{1,2}, 1)$ to $i'_{1,2}$ is defined, and $i'_{1,2}$ and $i_{2,2}$ are reported by the eNB together with the CQI in those CQI/PMI reporting instances. On such example mapping is illustrated in Table 12. It is further noted that similar tables can be straightforwardly constructed with permuting rows and columns, without deviating from the principles of the present disclosure.

TABLE 12

Mapping of $i_{1,2}$ and 1 from $i'_{1,2}$

| $i'_{1,2}$ | $i_{1,2}$ | 1 |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |

It is noted that either $i_{2,1}$ or $i_{2,2}$ in FIG. 13 can be dropped from the CSI report of the UE, according to some embodiments of the present disclosure. In one such example, the UE is configured with WB/LT PMI for the second dimension (or beam index), and then the UE report $i_{1,2}$, 1 and corresponding CQI in those subframes in which $i_{1,2}$, $i_{2,2}$, 1 and corresponding CQI are reported in FIG. 13.

PMI Feedback Indices

In some embodiments, A UE is configured to report m, n, p, used for constructing a precoder according to a codebook construction associated with FIG. 13, with an assumption that m=m' and n=n'.

In one method, each of m and n are decomposed into: $m=G_{1,1}i_{1,1}+G_{1,2}i_{1,2}$ and $n=G_{2,1}i_{2,1}+G_{2,2}i_{2,2}$, wherein:
$G_{1,1}, G_{1,2}, G_{2,1}, G_{2,2} \in \{1,2\}$, which can be configured by higher layer;

$$i_{1,1} \in \left\{0, 1, ..., \frac{M'}{S_M}\right\}, i_{2,1} \in \left\{0, 1, ..., \frac{N'}{S_N}\right\}.$$

For $i_{1,2}$, $i_{2,2}$, three possible configurations are devised below, where a certain configuration to be used by the UE can be either indicated by higher layer or a single configuration is used. In case of $i_{1,2}=0$ (or $i_{2,2}=0$), $i_{1,2}$ (or $i_{2,2}$) is pre-configured at both eNB and the UE and is not included in the feedback report.
  Config 1: $i_{1,2}=0$, $i_{2,2} \in \{0,1,2,3\}$,
  Config 2: $i_{1,2} \in \{0,1\}$, $i_{2,2} \in \{0,1\}$,
  Config 3: $i_{1,2} \in \{0,1,2,3\}$, $i_{2,2}=0$.

In another method, each of m and n are decomposed into: $m=G_{1,1}i_{1,1}+i_{1,2}$ and $n=G_{2,1}i_{2,1}+i_{2,2}$, wherein:
$G_{1,1}, G_{1,2} \in \{1,2\}$, which can be configured by higher layer;

$$i_{1,1} \in \left\{0, 1, ..., \frac{M'}{S_M}\right\}, i_{2,1} \in \left\{0, 1, ..., \frac{N'}{S_N}\right\}.$$

For $i_{1,2}$, $i_{2,2}$, four possible configurations are devised below, where a certain configuration to be used by the UE can be indicated by higher layer or a single configuration is used. In case of $i_{1,2}=0$ (or $i_{2,2}=0$), $i_{1,2}$ (or $i_{2,2}$), is pre-configured at both eNB and the UE and is not included in the feedback report.
  Config 1: $i_{1,2}=0$, $i_{2,2} \in \{0,1,2,3\}$,
  Config 2-1: $i_{1,2} \in \{0,1\}$, $i_{2,2} \in \{0,1\}$,
  Config 2-2: $i_{1,2} \in \{0,2\}$, $i_{2,2} \in \{0,2\}$,
  Config 2-3: $i_{1,2} \in \{0,1\}$, $i_{2,2} \in \{0,2\}$,
  Config 2-3: $i_{1,2} \in \{0,2\}$, $i_{2,2} \in \{0,1\}$,
  Config 3: $i_{1,2} \in \{0,1,2,3\}$, $i_{2,2}=0$ In one such embodiment, for example, a UE is configured to report four PMIs: $i_{1,1}$, $i_{2,1}$, $i_{1,2}$ and p, so that eNB can reconstruct a composite precoder with the three PMIs. The resulting precoder is written as:

$$W_{m,n,p} = [w_0 \; w_1 \; ... \; w_{N_{CSIRS}-1}]^t = \frac{1}{\sqrt{N_{CSIRS}}} \begin{bmatrix} v_m \otimes u_n \\ \varphi_p(v_{m'} \otimes u_{n'}) \end{bmatrix},$$

wherein:
  $m=G_{1,1}i_{1,1}+G_{1,2}i_{1,2}$, $n=G_{2,1}i_{2,1}$, $$i_{1,1} \in \left\{0, 1, ..., \frac{M'}{S_M}\right\}, i_{2,1} \in \left\{0, 1, ..., \frac{N'}{S_N}\right\};$$

$i_{1,2} \in \{0,1,2,3\}$ and $p \in \{0,1,2,3\}$.

In some embodiments, a new TM X is introduced as a transmission mode for FD-MIMO, whose main characteristics is e.g., more than 2 orthogonal DMRS ports for MU-MIMO; and/or a new CSI process that can comprise both NP and BF CSI-RS, wherein NP CSI-RS comprises (8), 12 or 16 antenna ports.

In the legacy specifications (3GPP TS 36.213), the following types of CSI reports are defined: The following CQI/PMI and RI reporting types with distinct periods and offsets are supported for the PUCCH CSI reporting modes given in Table 7.2.2-3:

Type 1 report supports CQI feedback for the UE selected sub-bands

Type 1a report supports subband CQI and second PMI feedback

Type 2, Type 2b, and Type 2c report supports wideband CQI and PMI feedback

Type 2a report supports wideband PMI feedback

Type 3 report supports RI feedback

Type 4 report supports wideband CQI

Type 5 report supports RI and wideband PMI feedback

Type 6 report supports RI and PTI feedback

The UE behaviour for PUCCH mode 1-1 according to some embodiments of the present disclosure (e.g., embodiments related to FIG. 13 and FIG. 15) can be written as:

In the case where wideband CQI/PMI reporting is configured with NP CSI-RS with 12 or 16 CSI-RS ports for TM X:

The reporting instances for wideband CQI/PMI are subframes satisfying $(10 \times n_f + \lfloor n_s/2 \rfloor - N_{OFFSET,CQI}) \mod(N_{pd}) = 0$.

i. The first PMI report has period $G \cdot N_{pd}$, and is reported on the subframes satisfying $(10 \times n_f + \lfloor n_s/2 \rfloor - N_{OFFSET,CQI}) \mod(G \cdot N_{pd}) = 0$, where G is signaled by higher layers.

ii. Between every two consecutive first PMI reports, the remaining reporting instances are used for a wideband second precoding matrix indicator with wideband CQI.

In the subframe where CQI/PMI derived with NP CSI-RS resource with 12 or 16 CSI-RS ports is reported for TM X, (a) A single precoding matrix is selected from the codebook subset assuming transmission on set S subbands.

(b) A UE reports a type 2b report consisting of
  i. A single wideband CQI value which is calculated assuming the use of a single precoding matrix in all subbands and transmission on set S subbands.
  ii. The wideband second PMI corresponding to the selected single precoding matrix.
  iii. When RI>1, an additional 3-bit wideband spatial differential CQI.

In the subframe where CQI/PMI derived with BF CSI-RS resource is reported for TM X, (a) A single precoding matrix is selected from the codebook subset assuming transmission on set S subbands.

(b) Alt 1: A UE reports a type 2 report consisting of
  i. A single wideband CQI value which is calculated assuming the use of a single precoding matrix in all subbands and transmission on set S subbands.
  ii. The selected single PMI (wideband PMI).
  iii. When RI>1, an additional 3-bit wideband spatial differential CQI.

(c) Alt 2: A UE reports a type 2b report consisting of
  i. A single wideband CQI value which is calculated assuming the use of a single precoding matrix in all subbands and transmission on set S subbands.
  ii. The wideband second PMI corresponding to the selected single precoding matrix.
  iii. When RI>1, an additional 3-bit wideband spatial differential CQI.

In the subframe where the wideband first PMI derived with NP CSI-RS resource with 12 or 16 CSI-RS ports is reported for TM X, (a) A UE reports a type 2a report consisting of the wideband first PMI corresponding to a selected set of precoding matrices.

In most of the embodiments of the present disclosure, a CSI-RS resource refers to a non-zero-power (NZP) CSI-RS resource unless otherwise stated. In the TS36.331 an NZP CSI-RS resource can be configured utilizing a higher-layer information element (IE) CSI-RS-ConfigNZP:

The IE CSI-RS-ConfigNZP is the CSI-RS resource configuration using non-zero power transmission that E-UTRAN may configure on a serving frequency.

CSI-RS-ConfigNZP information elements

```
-- ASN1START
CSI-RS-ConfigNZP-r11 ::=      SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qcl-CRS-Info-r11               SEQUENCE {
        qcl-ScramblingIdentity-r11     INTEGER (0..503),
        crs-PortsCount-r11             ENUMERATED {n1, n2, n4 spare1},
        mbsfn-SubframeConfigList-r11   CHOICE {
            release                        NULL,
            setup                          SEQUENCE {
                subframeConfigList             MBSFN-SubframeConfigList
            }
        }                                                    OPTIONAL   -- Need ON
    }                                                        OPTIONAL,  -- Need OR
    ...
}
-- ASN1STOP
```

| CSI-RS-ConfigNZP field descriptions | |
| --- | --- |
| antennaPortsCount | |
| Parameter represents the number of antenna ports used for transmission of CSI reference signals where an1 corresponds to 1, an2 to 2 antenna ports etc. see TS 36.211 [21, 6.10.5]. | |
| qcl-CRS-Info | |
| Indicates CRS antenna ports that is quasi co-located with the CSI-RS antenna ports, see TS 36.213 [23, 7.2.5]. EUTRAN configures this field if and only if the UE is configured with qcl-Operation set to typeB. | |
| resourceConfig | |
| Parameter: CSI reference signal configuration, see TS 36.211 [21, table 6.10.5.2-1 and 6.10.5.2-2]. | |
| subframeConfig | |
| Parameter: $I_{CSI-RS}$, see TS 36.211 [21, table 6.10.5.3-1]. | |
| scramblingIdentity | |
| Parameter: Pseudo-random sequence generator parameter, $n_{ID}$, see TS 36.213 [23, 7.2.5]. | |

Rel. 8 LTE 2-Tx Codebook

For transmission on two antenna ports, $p \in \{0,1\}$, and for the purpose of CSI reporting based on two antenna ports $p \in \{0,1\}$ or $p \in \{15,16\}$, the precoding matrix W(i) is selected from Table or a subset thereof. For the closed-loop spatial multiplexing transmission mode defined in [4], the codebook index 3 is not used when the number of layers is $v=2$.

TABLE 13

Codebook for transmission on antenna ports {0, 1} and for CSI reporting based on antenna ports {0, 1} or {15, 16}.

| Codebook index | Number of layers v | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

The eNB operation according to some embodiments of the present disclosure is as follows:

a. eNB determines precoders (or beamforming directions) for Q CSI-RS ports, based upon uplink sounding reference signals, PUSCH/PUCCH or history of PMI feedback or a combination of the aforementioned.

b. CSI-RS virtualization (or beamforming) examples:

i. Q ports are partitioned into two groups, CSI-RS of an antenna port belonging to a first group is transmitted from a first group of antennas with a first polarization of p=0; CSI-RS of an antenna port belonging to a second group is transmitted from a second group of antennas with a second polarization with a first polarization of p=1.

1. In one example, when Q is even, CSI-RS on port 0, ..., Q/2−1 are transmitted on a first group of antennas {(m,n,p=0), m=0, ..., M−1, n=0, ..., N−1}, with +45° polarization, while CSI-RS on port Q/2, ..., Q−1 are transmitted on a second group of antennas {(m,n,p=1), m=0, ..., M−1, n=0, ..., N−1}, with −45° polarization.

ii. Q antenna ports are partitioned into Q/2 pairs of antenna ports. Both antenna ports of each pair are mapped onto the same set of antenna element locations with the same precoding or beamforming (i.e., both are mapped onto a same set of {(m,n)} and a same precoding is applied on the set of antennas with the same polarization), but they are on the antennas with different polarization, i.e., a first port is mapped onto p=0 and a second port is mapped onto p=1. It is noted that the same precoding here is just for the ease of illustration, and the principles of the related embodiments can apply even if different precoding is applied to the sets of differently polarized antennas.

1. In one example, a first CSI-RS of a first pair of CSI-RS ports is transmitted on a first group of antennas (or TXRUs) {(m,n,p=0), m=0, ..., M−1, n=0, ..., N−1}, with +45° polarization wherein a first antenna virtualization precoder $w^{(1)}$ is applied on the group of antennas; and a second CSI-RS of the pair of CSI-RS is transmitted on a second group of antennas (or TXRUs) {(m,n,p=1), m=0, ... M−1, n=0, ..., N−1}, with −45° polarization, wherein the same antenna virtualization precoder $w^{(1)}$ is applied on the group of antennas. When M=8 and N=2, for example, the virtualization mapping on the MN elements with a first polarization for the first CSI-RS (denoted as $s_{a=0}$) and the mapping for the second CSI-RS (denoted as $s_{a=1}$) would respectively be:

$$\begin{bmatrix} x_{(m=0,n=0,p=0)} \\ \vdots \\ x_{(m=7,n=0,p=0)} \\ x_{(m=0,n=1,p=0)} \\ \vdots \\ x_{(m=7,n=1,p=0)} \end{bmatrix} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix} s_{a=0}; \text{ and}$$

$$\begin{bmatrix} x_{(m=0,n=0,p=1)} \\ \vdots \\ x_{(m=7,n=0,p=1)} \\ x_{(m=0,n=1,p=1)} \\ \vdots \\ x_{(m=7,n=1,p=1)} \end{bmatrix} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix} s_{a=1},$$

wherein $x_{(m,n,p)}$ is a signal mapped on element (m, n, p), and $$w^{(1)} = \begin{bmatrix} w^{(1)}_{(m=0,n=0)} \\ \vdots \\ w^{(1)}_{(m=7,n=0)} \\ w^{(1)}_{(m=0,n=1)} \\ \vdots \\ w^{(1)}_{(m=7,n=1)} \end{bmatrix}.$$

c. Q may be decomposed into $Q=N_P \cdot N_H \cdot N_V$, wherein $N_P$ is number of polarization dimensions, $N_H$ is a number of antenna ports in a row; and $N_V$ is a number of antenna ports in column of 2D rectangular antenna array. In one example, $N_P=2$, $N_V=4$ and $N_H=4$.

Figure 16:
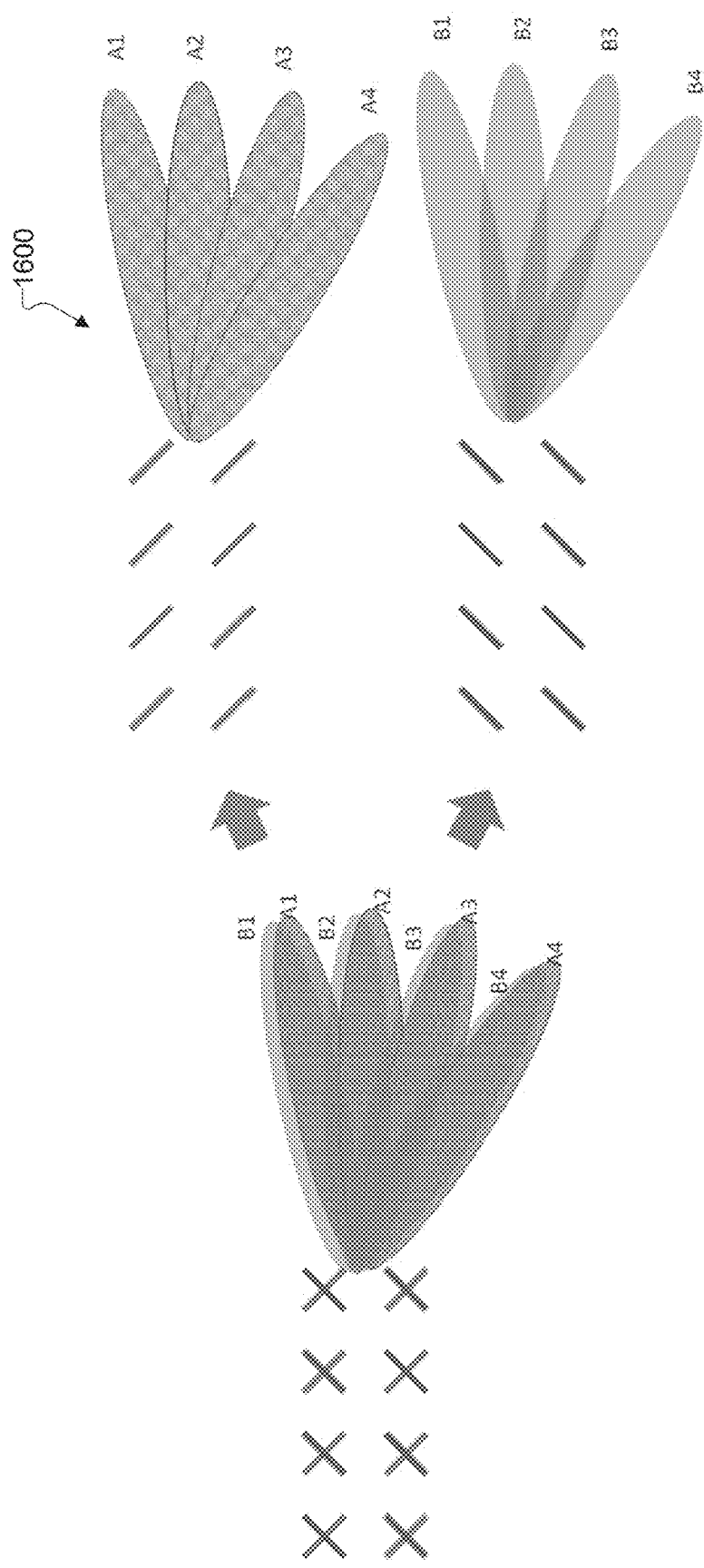
FIG. 16 illustrates eNB's beamformed CSI-RS transmission according to some embodiments of the present disclosure.

FIG. 16 illustrates eNB's beamformed CSI-RS transmission 1600 according to some embodiments of the present disclosure. In the figure, eNB transmits 8-port CSI-RS, labeled as A1-A4 and B1-B4, wherein A1-A4 are beams generated with a group of antenna ports with a first polarization, and B1-B4 are beams generated with a group of antenna ports with a second polarization.

In some embodiments, the four beams in FIG. 16 may correspond to adjacent/non-orthogonal beams.

Figure 17:
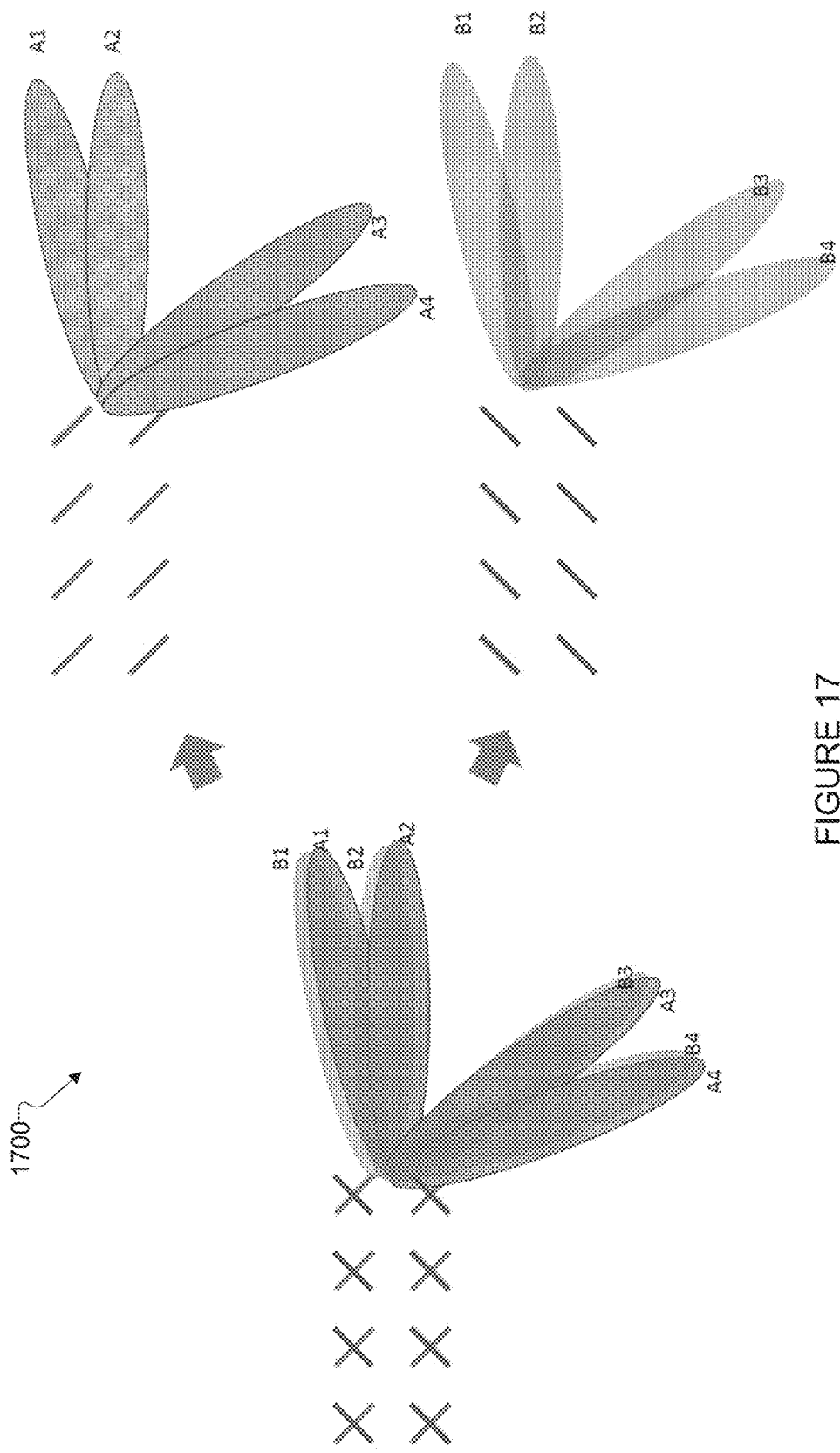
FIG. 17 illustrates eNB's beamformed CSI-RS transmission according to some embodiments of the present disclosure.

FIG. 17 illustrates eNB's beamformed CSI-RS transmission 1700 according to some embodiments of the present disclosure. In these embodiments, eNB transmits two groups of orthogonal beams, where A1/B1 and A3/B3 are orthogonal to each other, and A2/B2 and A4/B4 are orthogonal to each other. Furthermore, A1/B1 and A2/B2 are adjacent beams; and A3/B3 and A4/B4 are adjacent beams. Similarly to the embodiments related to FIG. 16, for each beam direction two beams are transmitted: one (denoted by A#, e.g., A1) from a first polarization and the other (denoted by B#, e.g., B1) from a second polarization.

In some embodiments, the two orthogonal beams A1/B1 and A3/B3, and A2/B2 and A4/B4 are orthogonal in either one of the two dimensions, horizontal and vertical, or in both dimensions. For example, when $A1=b_{v1} \otimes b_{h1}$ and $A3=b_{v3} \otimes b_{h3}$, then we may either have $(b_{v1}, b_{v3})$ as the orthogonal pair; or $(b_{h1}, b_{h3})$ as the orthogonal pair, or both $(b_{v1}, b_{v3})$, and $(b_{h1}, b_{h3})$ as orthogonal pairs.

In some embodiments, eNB configures beam directions for beamformed CSI-RS for a UE, according to the uplink sounding measurement. When eNB measures that the UE has large angle spread enough to support orthogonal beams, the eNB configures the beam directions according to the embodiments related to FIG. 17; when the eNB measures that the UE has too small angle spread to support orthogonal beams, the eNB configures the beam directions according to the embodiments related to FIG. 16.

When eNB transmits beams of beamformed CSI-RS according to FIG. 17, the UE can support more than rank 2 transmissions, with exploiting both x-pol orthogonality and beam orthogonality. In such a case, the UE is configured to report more than rank 2 CSI in its CSI report.

When eNB transmits beams of beamformed CSI-RS according to FIG. 16, the UE cannot support more than rank 2 transmissions, as only x-pol orthogonality can be exploited for 2-layer transmissions. In such a case, the UE is configured to report up to rank 2 CSI in its CSI report.

It is noted that eNB should be able to configure the beam directions dependent upon UE's angle spread, UE distribution, carrier frequency, etc. Hence, it would be desirable if the related specification designs support eNB's flexible configuration of beam directions.

Although the figures (i.e., FIG. 16 and FIG. 17) illustrate a case with a particular number of CSI-RS (i.e., 8-port CSI-RS), the embodiments associated with the figure are generally applicable to any number of CSI-RS, including 2-port CSI-RS (comprising A1 and B1), and 4-port CSI-RS (comprising A1, A2, B1 and B2).

UE's CSI reporting behavior changes dependent upon whether beamformed CSI-RS or non-precoded CSI-RS is configured. In case beamformed CSI-RS is configured, the UE is configured to report selected beam index (BI); on the other hand non-precoded CSI-RS is configured the UE is configured to report the first PMI (also known as W1 or $i_1$ in the relevant sections of 3GPP TS 36.213) for a precoder beam selection.

In some embodiments, a UE can be configured to report either the first PMI (W1) or BI. When BI is reported, the BI is reported in place of W1 in both PUSCH and PUCCH reports. To control this behavior, it is necessary for eNB to configure the UE of the CSI reporting type: BI or the first PMI. A few alternatives for eNB's indicating this configuration are devised as follows.

Alt 1: A new information element (IE) is added to the CSI-RS resource configuration (i.e., CSI-RS-ConfigNZP in 3GPP TS 36.331) to indicate whether a CSI-RS type is beamformed or non-precoded. If a UE is configured with non-precoded CSI-RS, the UE is further configured to report the first PMI (W1); on the other hand, if the UE is configured with beamformed CSI-RS, the UE is further configured to report BI.

Alt 2: A new IE is added to the CSI reporting configuration (i.e., CQI-ReportConfig in 3GPPTS36.331) to indicate whether a UE should report W1 or BI.

Alt 3: A group of new feedback modes may be added for each of PUCCH and PUSCH reporting for the BI reporting. In one example, the PUSCH and PUCCH reporting mode tables can be revised into Table 14, so that now additional columns are used for BI feedback modes (added an appending "a" to the mode names for PMI).

TABLE 14

CQI and PMI Feedback Types for PUSCH CSI reporting Modes

| | | PMI Feedback Type | | | |
|---|---|---|---|---|---|
| | | No PMI | Single PMI | Single BI | Multiple PMI | Multiple BIs |
| PUSCH CQI Feedback Type | Wideband (wideband CQI) | | | | Mode 1-2 | Mode 1-2a |
| | UE Selected (subband CQI) | Mode 2-0 | | | Mode 2-2 | Mode 2-2a |
| | Higher Layer-configured (subband CQI) | Mode 3-0 | Mode 3-1 | Mode 3-1a | Mode 3-2 | Mode 3-2a |

TABLE 15

CQI and PMI Feedback Types for PUCCH CSI reporting Modes

| | | PMI Feedback Type | | |
|---|---|---|---|---|
| | | No PMI | Single PMI | Single BI |
| PUCCH CQI Feedback Type | Wideband (wideband CQI) | Mode 1-0 | Mode 1-1 | Mode 1-1a |
| | UE Selected (subband CQI) | Mode 2-0 | Mode 2-1 | Mode 2-1a |

Alt 4: A new set of CSI-RS port numbers (e.g., 200-207) are allocated to beamformed CSI-RS. If antenna ports 15-22 (and 23-30) are configured, the UE reports W1; else if antenna ports 200-207 are configured, the UE reports BI.

In some embodiments, for the operations related FIG. 17, eNB configures one CSI-RS resource for all the CSI-RS antenna ports A1-A4 and B1-B4.

In one method (Method 1), the antenna ports A1-A4 and B1-B4 map to antenna ports 15-22 in 3GPP LTE. In another method (Method 2), the antenna ports are mapped to antenna ports 200-207, which are allocated for beamformed CSI-RS. In another method (Method 3 & 4), two adjacent port numbers are allocated to one in a first beam group comprising A1-A4, and the other in a second beam group comprising B1-B4. The below table illustrates these three methods.

TABLE 16

| Alternatives | Beam (or antenna port) numbers in FIG. 17 | Assigned antenna port numbers |
|---|---|---|
| Method 1 | {A1-A4, B1-B4} | 15-22 of a CSI-RS resource |
| Method 2 | {A1-A4, B1-B4} | 200-207 of a first CSI-RS resource |
| Method 3 | {A1, B1, A2, B2, A3, B3, A4, B4} | {15, 16, 17, 18, 19, 20, 21, 22} |
| Method 3 | {A1, B1, A2, B2, A3, B3, A4, B4} | {200, 201, 202, 203, 204, 205, 206, 207} |

In some embodiments, for the operations related FIG. 17, eNB configures two CSI-RS resources comprising a CSI process: one for A1-A4 and the other for B1-B4.

In one method, each group of the antenna ports A1-A4 and B1-B4 respectively maps to antenna ports 15-18 in 3GPP LTE. In another method, each group is mapped to antenna ports 200-203, which are allocated for beamformed CSI-RS. The below table illustrates these two methods.

TABLE 17

| Alternatives | Beam (or antenna port) numbers in FIG. 16 | Assigned antenna port numbers |
|---|---|---|
| Method 1 | A1-A4 | 15-18 of a first CSI-RS resource |
| | B1-B4 | 15-18 of a second CSI-RS resource |
| Method 2 | A1-A4 | 200-203 of a first CSI-RS resource |
| | B1-B4 | 200-203 of a second CSI-RS resource |

In some embodiments, a UE is configured to receive Q port CSI-RS transmitted according to FIG. 17, and is further configured to select one pair of antenna ports for CSI reporting. Here, the one pair of antenna ports comprise a first antenna port selected from antenna ports A1-A4, and a second antenna port selected from antenna ports B1-B4.

In one such embodiment, the UE is configured with Q=8 port CSI-RS according to FIG. 17, and the BI comprises 4 bits, wherein 2 bits are for indicating one port out of ports A1-A4, and the other 2 bits are for indicating one port out of ports B1-B4. As the number of bits used for BI is 4 bits, which is the same as the number of bits used for W1 feedback in legacy LTE, it is proposed that the BI replace W1 (the first PMI, or $i_1$) in both PUCCH and PUSCH reports when TM9 and 10 or another TM defined for FD-MIMO is configured.

TABLE 18

Port indication using $1^{st}$ and $2^{nd}$ BIs

| Reported value for $1^{st}$ BI (2 bits) | Selected port index | Reported value for $2^{nd}$ BI (2 bits) | Selected port index |
|---|---|---|---|
| 00 | A1 | 00 | B1 |
| 01 | A2 | 01 | B2 |
| 10 | A3 | 10 | B3 |
| 11 | A4 | 11 | B4 |

In another such embodiment, the UE is configured with Q=8 port CSI-RS according to FIG. 17, and the BI comprises 2 bits, wherein the 2 bits are for indicating one port out of each of two port groups: ports A1-A4 and ports B1-B4. It is proposed that the BI replace W1 (the first PMI, or $i_1$) in both PUCCH and PUSCH reports when TM 9 and 10 or another TM defined for FD-MIMO is configured.

TABLE 19

Port indication using BI

| Reported value for BI (2 bits) | Selected port index | Selected port index |
|---|---|---|
| 00 | A1 | B1 |
| 01 | A2 | B2 |
| 10 | A3 | B3 |
| 11 | A4 | B4 |

According to FIG. 17, the two selected ports corresponding to a single BI value in Table 19 are for a same beam with two different polarizations.

In these embodiments, the UE can be further configured to report beam co-phase PMI (e.g., according to 2-Tx PMI table: Table 13) and corresponding CQI, wherein the co-phase PMI is applied on the selected two ports.

In some embodiments, for CQI derivation purpose, UE needs to assume that PDSCH signals on antenna ports {7 . . . 6+ν} for ν∈{1,2} layers would result in signals equivalent to corresponding symbols transmitted on antenna numbers A∈{A1, A2, A3, A4} and B∈{B1, B2, B3, B4}, as given by $$\begin{bmatrix} y^{(A)}(i) \\ y^{(B)}(i) \end{bmatrix} = W(i) \begin{bmatrix} x^{(0)}(i) \\ \vdots \\ x^{(\nu-1)}(i) \end{bmatrix},$$

where $x(i)=[x^{(0)}(i) \ldots x^{(\nu-1)}(i)]^T$ is a vector of symbols from the layer mapping in subclause 6.3.3.2 of 3GPP TS36.211, where W(i) is a co-phase matrix, or the precoding matrix in Table 14, corresponding to the reported PMI applicable to $x(i)$.

In some embodiments, a UE is configured to receive Q=8 port CSI-RS transmitted according to FIG. 17, and is further configured to report information on the identity of one or two selected pair(s) of antenna ports and a co-phase, corresponding to a new PMI. Here, the one pair of antenna ports comprise a first antenna port selected from antenna ports A1-A4, and a second antenna port selected from antenna ports B1-B4.

In one method (denoted as Method 1), the information on the pair(s) of selected antenna ports and a co-phase is indicated by a single bit field. In one such embodiment, the UE is configured to report a 4-bit PMI, to indicate selected pair(s) of ports and a co-phase matrix.

In another method (denoted as Method 2), a first bit field indicates the pair(s) of selected antenna ports; and a second bit field indicates the co-phase. In one such embodiment, the UE is configured to report the first and the second bit fields, wherein each of the first and the second bit fields comprise two bits.

For 1-layer CSI reporting, only one pair of antenna ports is selected. In this case, a UE would assume the following equation to derive PMI/CQI/RI:

$$\begin{bmatrix} y^{(A)}(i) \\ y^{(B)}(i) \end{bmatrix} = W(i)x^{(0)}(i).$$

Example indication table for 1-layer CSI reporting according to Method 1 can be found in Table 20.

TABLE 20

Port and co-phase indication using a 4-bit field for 1-layer CSI reporting

| Reported value for a new PMI (the 4-bit field) | Selected port indices (A, B); and a co-phase matrix: W(i) |
|---|---|
| 0 | (A1, B1); $\frac{1}{\sqrt{2}}\begin{bmatrix}1\\1\end{bmatrix}$ |
| 1 | (A1, B1); $\frac{1}{\sqrt{2}}\begin{bmatrix}1\\j\end{bmatrix}$ |
| 2 | (A1, B1); $\frac{1}{\sqrt{2}}\begin{bmatrix}1\\-1\end{bmatrix}$ |
| 3 | (A1, B1); $\frac{1}{\sqrt{2}}\begin{bmatrix}1\\-j\end{bmatrix}$ |
| 4 | (A2, B2); $\frac{1}{\sqrt{2}}\begin{bmatrix}1\\1\end{bmatrix}$ |
| 5 | (A2, B2); $\frac{1}{\sqrt{2}}\begin{bmatrix}1\\j\end{bmatrix}$ |
| 6 | (A2, B2); $\frac{1}{\sqrt{2}}\begin{bmatrix}1\\-1\end{bmatrix}$ |
| 7 | (A2, B2); $\frac{1}{\sqrt{2}}\begin{bmatrix}1\\-j\end{bmatrix}$ |
| 8 | (A3, B3); $\frac{1}{\sqrt{2}}\begin{bmatrix}1\\1\end{bmatrix}$ |
| 9 | (A3, B3); $\frac{1}{\sqrt{2}}\begin{bmatrix}1\\j\end{bmatrix}$ |
| 10 | (A3, B3); $\frac{1}{\sqrt{2}}\begin{bmatrix}1\\-1\end{bmatrix}$ |
| 11 | (A3, B3); $\frac{1}{\sqrt{2}}\begin{bmatrix}1\\-j\end{bmatrix}$ |
| 12 | (A4, B4); $\frac{1}{\sqrt{2}}\begin{bmatrix}1\\1\end{bmatrix}$ |
| 13 | (A4, B4); $\frac{1}{\sqrt{2}}\begin{bmatrix}1\\j\end{bmatrix}$ |
| 14 | (A4, B4); $\frac{1}{\sqrt{2}}\begin{bmatrix}1\\-1\end{bmatrix}$ |
| 15 | (A4, B4); $\frac{1}{\sqrt{2}}\begin{bmatrix}1\\-j\end{bmatrix}$ |

Example indication table for 1-layer CSI reporting according to Method 2 can be found in Table 21 and Table 22.

TABLE 21

Selected port indication for 1-layer CSI reporting

| Value in the first bit field (2 bits) | Selected port indices (A, B) |
|---|---|
| 0 | (A1, B1) |
| 1 | (A2, B2) |
| 2 | (A3, B3) |
| 3 | (A4, B4) |

TABLE 22

Co-phase precoder indication for 1-layer CSI reporting

| Value in the second bit field (2 bits) | Co-phase precoder |
|---|---|
| 0 | $\frac{1}{\sqrt{2}}\begin{bmatrix}1\\1\end{bmatrix}$ |
| 1 | $\frac{1}{\sqrt{2}}\begin{bmatrix}1\\j\end{bmatrix}$ |
| 2 | $\frac{1}{\sqrt{2}}\begin{bmatrix}1\\-1\end{bmatrix}$ |
| 3 | $\frac{1}{\sqrt{2}}\begin{bmatrix}1\\-j\end{bmatrix}$ |

For 2-layer CSI reporting, either one or two pairs of antenna ports are selected. In this case, a UE would either of the following two equations to derive PMI/CQI/RI, depending on the value to report in the 4-bit field:

$$\begin{bmatrix} y^{(S1)}(i) \\ y^{(S2)}(i) \end{bmatrix} = W(i)\begin{bmatrix} x^{(0)}(i) \\ x^{(1)}(i) \end{bmatrix}, \quad \text{Eqn 1}$$

wherein W(i) is a 2×2 matrix; or $$\begin{bmatrix} y^{(S1)}(i) \\ y^{(S2)}(i) \\ y^{(S3)}(i) \\ y^{(S4)}(i) \end{bmatrix} = W(i) \begin{bmatrix} x^{(0)}(i) \\ x^{(1)}(i) \end{bmatrix}, \quad \text{Eqn 2)}$$

wherein W(i) is a 4×2 matrix.

Example indication table for 2-layer CSI reporting according to Method 1 can be found in Table 23.

Eqn 1 is used when only one pair of antenna ports comprising a same beam are selected (or when the PMI value is 0-7), and Eqn 2 is used when two pairs of antenna ports respectively comprising two beams are selected (or when the PMI value is 8-15). When two beams are selected, each columns of 2-Tx rank-2 PMI are applied on either pair of antenna ports.

TABLE 23

Port and co-phase indication using a 4-bit field for 2-layer CSI reporting

| Reported value for a new PMI (the 4-bit field) | Selected port indices (S1, S2); and a co-phase matrix: W(i) | Reported value for a new PMI (the 4-bit field) | Selected port indices (S1,S2,S3,S4); and a co-phase matrix: W(i) |
|---|---|---|---|
| 0 | (A1, B1); $\frac{1}{2}\begin{bmatrix} 1 & 1 \\ 1 & -1 \end{bmatrix}$ | 8 | (A1, B1, A2, B2); $\frac{1}{2}\begin{bmatrix} 1 & 0 \\ 1 & 0 \\ 0 & 1 \\ 0 & -1 \end{bmatrix}$ |
| 1 | (A1, B1); $\frac{1}{2}\begin{bmatrix} 1 & 1 \\ j & -j \end{bmatrix}$ | 9 | (A1, B1, A2, B2); $\frac{1}{2}\begin{bmatrix} 1 & 0 \\ j & 0 \\ 0 & 1 \\ 0 & -j \end{bmatrix}$ |
| 2 | (A2, B2); $\frac{1}{2}\begin{bmatrix} 1 & 1 \\ 1 & -1 \end{bmatrix}$ | 10 | (A2, B2, A3, B3); $\frac{1}{2}\begin{bmatrix} 1 & 0 \\ 1 & 0 \\ 0 & 1 \\ 0 & -1 \end{bmatrix}$ |
| 3 | (A2, B2); $\frac{1}{2}\begin{bmatrix} 1 & 1 \\ j & -j \end{bmatrix}$ | 11 | (A2, B2, A3, B3); $\frac{1}{2}\begin{bmatrix} 1 & 0 \\ j & 0 \\ 0 & 1 \\ 0 & -j \end{bmatrix}$ |
| 4 | (A3, B3); $\frac{1}{2}\begin{bmatrix} 1 & 1 \\ 1 & -1 \end{bmatrix}$ | 12 | (A1, B1, A4, B4); $\frac{1}{2}\begin{bmatrix} 1 & 0 \\ 1 & 0 \\ 0 & 1 \\ 0 & -1 \end{bmatrix}$ |
| 5 | (A3, B3); $\frac{1}{2}\begin{bmatrix} 1 & 1 \\ j & -j \end{bmatrix}$ | 13 | (A1, B1, A4, B4); $\frac{1}{2}\begin{bmatrix} 1 & 0 \\ j & 0 \\ 0 & 1 \\ 0 & -j \end{bmatrix}$ |
| 6 | (A4, B4); $\frac{1}{2}\begin{bmatrix} 1 & 1 \\ 1 & -1 \end{bmatrix}$ | 14 | (A2, B2, A4, B4); $\frac{1}{2}\begin{bmatrix} 1 & 0 \\ 1 & 0 \\ 0 & 1 \\ 0 & -1 \end{bmatrix}$ |
| 7 | (A4, B4); $\frac{1}{2}\begin{bmatrix} 1 & 1 \\ j & -j \end{bmatrix}$ | 15 | (A2, B2, A4, B4); $\frac{1}{2}\begin{bmatrix} 1 & 0 \\ j & 0 \\ 0 & 1 \\ 0 & -j \end{bmatrix}$ |

Example indication table for 2-layer CSI reporting according to Method 2 can be found in Table 24 and Table 25. As shown in Table 24, two types of 2-layer transmissions are supported: (1) a single beam: on a pair of antenna ports with two different polarizations (bit field values 0-3); and (2) a dual beam: on two pairs of antenna ports with two different polarizations (bit field values 4-7).

Eqn 1 is used when only one pair of antenna ports comprising a same beam are selected, and Eqn 2 is used when two pairs of antenna ports respectively comprising two beams are selected. When two beams are selected, each columns of 2-Tx rank-2 PMI are applied on either pair of antenna ports.

TABLE 4

=24 Selected port indication for 2-layer CSI reporting

| Value in the first bit field (3 bits) | Selected port indices (S1, S2) or (S1, S2, S3, S4) |
|---|---|
| 0 | (A1, B1) |
| 1 | (A2, B2) |
| 2 | (A3, B3) |
| 3 | (A4, B4) |
| 4 | (A1, B1, A2, B2) |
| 5 | (A2, B2, A3, B3) |
| 6 | (A1, B1, A4, B4) |
| 7 | (A2, B2, A4, B4) |

TABLE 25

Co-phase precoder indication for 2-layer CSI reporting

| Value in the second bit field (1 bit) | Co-phase precoder When two ports (or one pair of ports) selected | Co-phase precoder When four ports (or two pairs of ports) selected |
|---|---|---|
| 0 | $\frac{1}{2}\begin{bmatrix} 1 & 1 \\ 1 & -1 \end{bmatrix}$ | $\frac{1}{2}\begin{bmatrix} 1 & 0 \\ 1 & 0 \\ 0 & 1 \\ 0 & -1 \end{bmatrix}$ |
| 1 | $\frac{1}{2}\begin{bmatrix} 1 & 1 \\ j & -j \end{bmatrix}$ | $\frac{1}{2}\begin{bmatrix} 1 & 0 \\ j & 0 \\ 0 & 1 \\ 0 & -j \end{bmatrix}$ |

For 3-layer CSI reporting, four antenna ports, {S1, S2, S3, S4} are selected. In this case, the UE would use the following equation to derive PMI/CQI/RI:

$$\begin{bmatrix} y^{(S1)}(i) \\ y^{(S2)}(i) \\ y^{(S3)}(i) \\ y^{(S4)}(i) \end{bmatrix} = W(i) \begin{bmatrix} x^{(0)}(i) \\ x^{(1)}(i) \\ x^{(2)}(i) \\ x^{(3)}(i) \end{bmatrix}, \quad \text{Eqn 2)}$$

wherein W(i) is a 4×3 matrix.

An example table for 3-layer co-phase precoders on the selected antenna ports {S1, S2, S3, S4} can be found in Table 26. For the first two layers comprising the two ports S1 and S2 comprising a first beam, an x-pol orthogonality is exploited with a co-phase factor ($\varphi$) either 1 or j. A single stream is transmitted on the $3^{rd}$ layer comprising the two ports S3 and S4 comprising a second beam, with a co-phase factor 1 or −1.

TABLE 26

Co-phase precoder indication for 3-layer CSI reporting

| Value in the second bit field (2 bits) | Co-phase Precoder When four ports (or two pairs of ports) selected |
|---|---|
| 0 | $\frac{1}{2}\begin{bmatrix} 1 & 1 & 0 \\ 1 & -1 & 0 \\ 0 & 0 & 1 \\ 0 & 0 & 1 \end{bmatrix}$ |
| 1 | $\frac{1}{2}\begin{bmatrix} 1 & 1 & 0 \\ j & -j & 0 \\ 0 & 0 & 1 \\ 0 & 0 & 1 \end{bmatrix}$ |
| 2 | $\frac{1}{2}\begin{bmatrix} 1 & 1 & 0 \\ 1 & -1 & 0 \\ 0 & 0 & 1 \\ 0 & 0 & -1 \end{bmatrix}$ |
| 3 | $\frac{1}{2}\begin{bmatrix} 1 & 1 & 0 \\ j & -j & 0 \\ 0 & 0 & 1 \\ 0 & 0 & -1 \end{bmatrix}$ |

For 4-layer CSI reporting, four antenna ports, {S1, S2, S3, S4} are selected. In this case, the UE would use the following equation to derive PMI/CQI/RI:

$$\begin{bmatrix} y^{(S1)}(i) \\ y^{(S2)}(i) \\ y^{(S3)}(i) \\ y^{(S4)}(i) \end{bmatrix} = W(i) \begin{bmatrix} x^{(0)}(i) \\ x^{(1)}(i) \\ x^{(2)}(i) \\ x^{(3)}(i) \end{bmatrix}, \quad \text{Eqn 2)}$$

wherein W(i) is a 4×4 matrix.

An example table for 4-layer co-phase precoders on the selected antenna ports {S1, S2, S3, S4} can be found in Table 27.

Rank-4 co-phase precoders comprises four columns, wherein the first two columns are used for rank-2 precoding on the first two selected antenna ports (S1 and S2), and the last two columns are used for rank-2 precoding on the last two selected antenna ports (S3 and S4). For each of those two groups of rank-2 precoding, an x-pol orthogonality is exploited with a co-phase factor ($\varphi$) either 1 or j.

TABLE 27

Co-phase precoder indication for 4-layer CSI reporting

| Value in the second bit field (2 bits) | Co-phase Precoder When four ports (or two pairs of ports) selected |
|---|---|
| 0 | $\frac{1}{2}\begin{bmatrix} 1 & 1 & 0 & 0 \\ 1 & -1 & 0 & 0 \\ 0 & 0 & 1 & 1 \\ 0 & 0 & 1 & -1 \end{bmatrix}$ |

TABLE 27-continued

Co-phase precoder indication for 4-layer CSI reporting

| Value in the second bit field (2 bits) | Co-phase Precoder When four ports (or two pairs of ports) selected |
|---|---|
| 1 | $\frac{1}{2}\begin{bmatrix} 1 & 1 & 0 & 0 \\ j & -j & 0 & 0 \\ 0 & 0 & 1 & 1 \\ 0 & 0 & 1 & -1 \end{bmatrix}$ |
| 2 | $\frac{1}{2}\begin{bmatrix} 1 & 1 & 0 & 0 \\ 1 & -1 & 0 & 0 \\ 0 & 0 & 1 & 1 \\ 0 & 0 & j & -j \end{bmatrix}$ |
| 3 | $\frac{1}{2}\begin{bmatrix} 1 & 1 & 0 & 0 \\ j & -j & 0 & 0 \\ 0 & 0 & 1 & 1 \\ 0 & 0 & j & -j \end{bmatrix}$ |

In some embodiments, when beamformed CSI-RS is configured, for facilitating eNB's flexible beam allocation across the antenna ports, UE can be configured with a plurality of sets of port numbers to be indicated by the values of a PMI bit field. The UE is higher-layer configured with a set of port indices for each value of the PMI bit field. Furthermore, when beamformed CSI-RS is configured, the UE can additionally be configured the maximum number of layers (i.e., maximum RI) to be reported in the CSI reports.

In one method, this higher-layer indication is configured for more than n layer CSI reporting wherein n is an integer ≥1. For each rank supported by the UE greater than n, the UE is configured with a plurality of sets of port indices, to be mapped to either a subset or a full set of values of a PMI bit field of the corresponding rank.

In one such embodiment, n=1, in which case the higher-layer indication is configured for RI>1.

In one such embodiment, n=1:
For 2-layer CSI reporting, four sets of port indices for RI=2 are configured by higher-layer, to be used for PMI values 4 to 7, e.g., according to Table 28.
For 3-layer CSI reporting, four sets of port indices for RI=3 are configured by higher-layer, to be used for PMI values 0 to 3, e.g., according to Table 29.
For 4-layer CSI reporting, four sets of port indices for RI=4 are configured by higher-layer, to be used for PMI values 0 to 3, e.g., according to Table 29.

It is noted that the tables here are just for illustration, and configuration of other number of sets can also be applicable according to the principles of the present disclosure.

TABLE 28

Selected port indication for 2-layer CSI reporting

| Value in the first bit field (3 bits) | Selected port indices (S1, S2) or (S1, S2, S3, S4) |
|---|---|
| 0 | (A1, B1) |
| 1 | (A2, B2) |
| 2 | (A3, B3) |
| 3 | (A4, B4) |
| 4 | A first set of four port indices for RI = 2 indicated by higher layer |
| 5 | A second set of four port indices for RI = 2 indicated by higher layer |
| 6 | A third set of four port indices for RI = 2 indicated by higher layer |
| 7 | A fourth set of four port indices for RI = 2 indicated by higher layer |

TABLE 29

Selected port indication for x-layer CSI reporting

| Value in the first bit field (2 bits) | Selected port indices (S1, S2, S3, S4) |
|---|---|
| 0 | A first set of four port indices for RI = x indicated by higher layer |
| 1 | A second set of four port indices for RI = x indicated by higher layer |
| 2 | A third set of four port indices for RI = x indicated by higher layer |
| 3 | A fourth set of four port indices for RI = x indicated by higher layer |

In some embodiments, a UE is configured to receive Q=4 port CSI-RS transmitted according to similarly to FIG. 17, and is further configured to report a precoding matrix to apply on the configured 4 CSI-RS ports, using a bit field, which corresponds to a new PMI. Here, the one pair of antenna ports comprise a first antenna port selected from antenna ports A1-A2, and a second antenna port selected from antenna ports B1-B2.

In one such embodiment, the UE is configured to report a PMI, the number of bits for which changes dependent upon the reported RI. In one method (denoted as method 1), a precoding equation for these embodiments can be written as:

$$\begin{bmatrix} y^{(A1)}(i) \\ y^{(B1)}(i) \\ y^{(A2)}(i) \\ y^{(B2)}(i) \end{bmatrix} = W(i) \begin{bmatrix} x^{(0)}(i) \\ \vdots \\ x^{(v-1)}(i) \end{bmatrix}.$$

In another method (denoted as method 2), the precoding equation for these embodiments can be written as:

$$\begin{bmatrix} y^{(A1)}(i) \\ y^{(A2)}(i) \\ y^{(B1)}(i) \\ y^{(B2)}(i) \end{bmatrix} = W(i) \begin{bmatrix} x^{(0)}(i) \\ \vdots \\ x^{(v-1)}(i) \end{bmatrix}.$$

In this case, the beam selection operation is replaced with placing 0's in the precoder matrix entries. For example, to select A1 and A2 out of the four ports, the last two rows of the precoder matrix W(i) are forced to be zero, and a PMI precoder is applied on the selected antenna ports of A1 and A2, as illustrated in the table entries for the PMI=0-3 in Table 30.

For 1-layer CSI reporting a 3-bit PMI is used. Example indication table for 1-layer CSI reporting can be found in Table 30.

TABLE 30

Precoder indication using a 3-bit field for 1-layer CSI reporting

| Reported value for a new PMI (the 3-bit field) | Precoder matrix W(i) Method 1 | Method 2 |
|---|---|---|
| 0 | $\frac{1}{\sqrt{2}}\begin{bmatrix}1\\1\\0\\0\end{bmatrix}$ | $\frac{1}{\sqrt{2}}\begin{bmatrix}1\\0\\1\\0\end{bmatrix}$ |
| 1 | $\frac{1}{\sqrt{2}}\begin{bmatrix}1\\j\\0\\0\end{bmatrix}$ | $\frac{1}{\sqrt{2}}\begin{bmatrix}1\\0\\j\\0\end{bmatrix}$ |
| 2 | $\frac{1}{\sqrt{2}}\begin{bmatrix}1\\-1\\0\\0\end{bmatrix}$ | $\frac{1}{\sqrt{2}}\begin{bmatrix}1\\0\\-1\\0\end{bmatrix}$ |
| 3 | $\frac{1}{\sqrt{2}}\begin{bmatrix}1\\-j\\0\\0\end{bmatrix}$ | $\frac{1}{\sqrt{2}}\begin{bmatrix}1\\0\\-j\\0\end{bmatrix}$ |
| 4 | $\frac{1}{\sqrt{2}}\begin{bmatrix}0\\0\\1\\1\end{bmatrix}$ | $\frac{1}{\sqrt{2}}\begin{bmatrix}0\\1\\0\\1\end{bmatrix}$ |
| 5 | $\frac{1}{\sqrt{2}}\begin{bmatrix}0\\0\\1\\j\end{bmatrix}$ | $\frac{1}{\sqrt{2}}\begin{bmatrix}0\\1\\0\\j\end{bmatrix}$ |
| 6 | $\frac{1}{\sqrt{2}}\begin{bmatrix}0\\0\\1\\-1\end{bmatrix}$ | $\frac{1}{\sqrt{2}}\begin{bmatrix}0\\1\\0\\-1\end{bmatrix}$ |
| 7 | $\frac{1}{\sqrt{2}}\begin{bmatrix}0\\0\\1\\-j\end{bmatrix}$ | $\frac{1}{\sqrt{2}}\begin{bmatrix}0\\1\\0\\-j\end{bmatrix}$ |

For 2-layer CSI reporting a 3-bit PMI is used. Example indication table for 2-layer CSI reporting can be found in Table 31.

TABLE 31

Precoder indication using a 3-bit field for 2-layer CSI reporting

| Reported value for a new PMI (the 3-bit field) | Precoder matrix W(i) Method 1 | Method 2 |
|---|---|---|
| 0 | $\frac{1}{2}\begin{bmatrix}1 & 1\\1 & -1\\0 & 0\\0 & 0\end{bmatrix}$ | $\frac{1}{2}\begin{bmatrix}1 & 1\\0 & 0\\1 & -1\\0 & 0\end{bmatrix}$ |
| 1 | $\frac{1}{2}\begin{bmatrix}1 & 1\\j & -j\\0 & 0\\0 & 0\end{bmatrix}$ | $\frac{1}{2}\begin{bmatrix}1 & 1\\0 & 0\\j & -j\\0 & 0\end{bmatrix}$ |
| 2 | $\frac{1}{2}\begin{bmatrix}0 & 0\\0 & 0\\1 & 1\\1 & -1\end{bmatrix}$ | $\frac{1}{2}\begin{bmatrix}0 & 0\\1 & 1\\0 & 0\\1 & -1\end{bmatrix}$ |
| 3 | $\frac{1}{2}\begin{bmatrix}0 & 0\\0 & 0\\1 & 1\\j & -j\end{bmatrix}$ | $\frac{1}{2}\begin{bmatrix}0 & 0\\1 & 1\\0 & 0\\j & -j\end{bmatrix}$ |
| 4 | $\frac{1}{2}\begin{bmatrix}1 & 0\\1 & 0\\0 & 1\\0 & -1\end{bmatrix}$ | $\frac{1}{2}\begin{bmatrix}1 & 0\\0 & 1\\1 & 0\\0 & -1\end{bmatrix}$ |
| 5 | $\frac{1}{2}\begin{bmatrix}1 & 0\\j & 0\\0 & 1\\0 & -j\end{bmatrix}$ | $\frac{1}{2}\begin{bmatrix}1 & 0\\0 & 1\\j & 0\\0 & -j\end{bmatrix}$ |
| 6 | Reserved | Reserved |
| 7 | Reserved | Reserved |

For 3-layer CSI reporting a 2-bit PMI is used. Example indication table for 3-layer CSI reporting can be found in Table 32.

TABLE 32

Precoder indication using a 2-bit field for 3-layer CSI reporting

| Reported value for a new PMI (the 2-bit field) | Precoder matrix W(i) Method 1 | Method 2 |
|---|---|---|
| 0 | $\frac{1}{\sqrt{8}}\begin{bmatrix}1 & 1 & 0\\1 & -1 & 0\\0 & 0 & 1\\0 & 0 & -1\end{bmatrix}$ | $\frac{1}{\sqrt{8}}\begin{bmatrix}1 & 1 & 0\\0 & 0 & 1\\1 & -1 & 0\\0 & 0 & -1\end{bmatrix}$ |
| 1 | $\frac{1}{\sqrt{8}}\begin{bmatrix}0 & 1 & 0\\0 & -1 & 0\\1 & 0 & 1\\1 & 0 & -1\end{bmatrix}$ | $\frac{1}{\sqrt{8}}\begin{bmatrix}0 & 1 & 0\\1 & 0 & 1\\0 & -1 & 0\\1 & 0 & -1\end{bmatrix}$ |

TABLE 32-continued

Precoder indication using a 2-bit field for 3-layer CSI reporting

| Reported value for a new PMI (the 2-bit field) | Precoder matrix W(i) | |
|---|---|---|
| | Method 1 | Method 2 |
| 2 | $\frac{1}{\sqrt{8}}\begin{bmatrix} 1 & 0 & 0 \\ 1 & 0 & 0 \\ 0 & 1 & 1 \\ 0 & 1 & -1 \end{bmatrix}$ | $\frac{1}{\sqrt{8}}\begin{bmatrix} 1 & 0 & 0 \\ 0 & 1 & 1 \\ 1 & 0 & 0 \\ 0 & 1 & -1 \end{bmatrix}$ |
| 3 | $\frac{1}{\sqrt{8}}\begin{bmatrix} 0 & 1 & 1 \\ 0 & 1 & -1 \\ 1 & 0 & 0 \\ 1 & 0 & 0 \end{bmatrix}$ | $\frac{1}{\sqrt{8}}\begin{bmatrix} 0 & 1 & 1 \\ 1 & 0 & 0 \\ 0 & 1 & -1 \\ 1 & 0 & 0 \end{bmatrix}$ |

For 4-layer CSI reporting a 1-bit PMI is used. Example indication table for 4-layer CSI reporting can be found in Table 33.

TABLE 33

Precoder indication using a 1-bit field for 4-layer CSI reporting

| Reported value for a new PMI (the 2-bit field) | Precoder matrix W(i) | |
|---|---|---|
| | Method 1 | Method 2 |
| 0 | $\frac{1}{4}\begin{bmatrix} 1 & 0 & 1 & 0 \\ 1 & 0 & -1 & 0 \\ 0 & 1 & 0 & 1 \\ 0 & 1 & 0 & -1 \end{bmatrix}$ | $\frac{1}{4}\begin{bmatrix} 1 & 0 & 1 & 0 \\ 0 & 1 & 0 & 1 \\ 1 & 0 & -1 & 0 \\ 0 & 1 & 0 & -1 \end{bmatrix}$ |
| 1 | $\frac{1}{4}\begin{bmatrix} 1 & 0 & 1 & 0 \\ j & 0 & -j & 0 \\ 0 & 1 & 0 & 1 \\ 0 & j & 0 & -j \end{bmatrix}$ | $\frac{1}{4}\begin{bmatrix} 1 & 0 & 1 & 0 \\ 0 & 1 & 0 & 1 \\ j & 0 & -j & 0 \\ 0 & j & 0 & -j \end{bmatrix}$ |

Although these embodiments are constructed assuming that the antenna ports are numbered in an order of (A1, B1, A2, B2), which gives particular placements of zero elements in the precoding matrix, it is noted that the same principle easily applies to different orders of antenna port numbers.

For example, if the antenna port numbers are in the order of (A1,A2, B1, B2), then the precoding equation is replaced to:

$$\begin{bmatrix} y^{(A1)}(i) \\ y^{(A2)}(i) \\ y^{(B1)}(i) \\ y^{(B2)}(i) \end{bmatrix} = W(i) \begin{bmatrix} x^{(0)}(i) \\ \vdots \\ x^{(\upsilon-1)}(i) \end{bmatrix},$$

and table entries in Table 30 Table for PMI=0 and 4 will be respectively replaced with $$\frac{1}{\sqrt{2}}\begin{bmatrix} 1 \\ 0 \\ 1 \\ 0 \end{bmatrix}$$

and $$\frac{1}{\sqrt{2}}\begin{bmatrix} 0 \\ 1 \\ 0 \\ 1 \end{bmatrix},$$

so that the selected antenna ports of (A1, B1) and (A2, B2) are correctly reflected in the precoder representation. Other table entries in Table can also be similarly constructed, and other tables can also be similarly constructed.

Although these embodiments are illustrated for Q=4, it is noted that the same principle applies to the cases of Q=8 and Q=2.

For example, for Q=8, in one method (denoted as Method 3, which is similar to Method 1) a precoding equation can be written as:

$$\begin{bmatrix} y^{(A1)}(i) \\ y^{(B1)}(i) \\ y^{(A2)}(i) \\ y^{(B2)}(i) \\ y^{(A3)}(i) \\ y^{(B3)}(i) \\ y^{(A4)}(i) \\ y^{(B4)}(i) \end{bmatrix} = W(i) \begin{bmatrix} x^{(0)}(i) \\ \vdots \\ x^{(\upsilon-1)}(i) \end{bmatrix}.$$

In another method (denoted as Method 4, which is similar to Method 2), the precoding equation can be written as:

$$\begin{bmatrix} y^{(A1)}(i) \\ y^{(A2)}(i) \\ y^{(A3)}(i) \\ y^{(A4)}(i) \\ y^{(B1)}(i) \\ y^{(B2)}(i) \\ y^{(B3)}(i) \\ y^{(B4)}(i) \end{bmatrix} = W(i) \begin{bmatrix} x^{(0)}(i) \\ \vdots \\ x^{(\upsilon-1)}(i) \end{bmatrix}.$$

The PMI precoding matrix tables of Table 30, Table 31, Table 32 and Table 33 can be correspondingly revised to reflect the new number of rows in this case, and the number of entries in each table become double, to cope with two additional beams (or 4 additional CSI-RS ports).

For 1-layer CSI reporting a 4-bit PMI is used. Example indication table for 1-layer CSI reporting according to Method 3 can be found in Table 34.

TABLE 34

Precoder indication using the 4-bit field for 1-layer CSI reporting (Method 3)

| Reported value for the new PMI | Precoder matrix W(i) |
|---|---|
| 0 | $\frac{1}{\sqrt{2}}[1\ 1\ 0\ 0\ 0\ 0\ 0\ 0]^t$ |

TABLE 34-continued

Precoder indication using the 4-bit field for 1-layer CSI reporting (Method 3)

| Reported value for the new PMI | Precoder matrix W(i) |
|---|---|
| 1 | $\frac{1}{\sqrt{2}}[1\ j\ 0\ 0\ 0\ 0\ 0\ 0]^t$ |
| 2 | $\frac{1}{\sqrt{2}}[1\ -1\ 0\ 0\ 0\ 0\ 0\ 0]^t$ |
| 3 | $\frac{1}{\sqrt{2}}[1\ -j\ 0\ 0\ 0\ 0\ 0\ 0]^t$ |
| 4-7 ([a b] = [1 1], [1 j], [1 -1], [1 -j] for 4, 5, 6, 7) | $\frac{1}{\sqrt{2}}[0\ 0\ a\ b\ 0\ 0\ 0\ 0]^t$ |
| 8-11 ([a b] = [1 1], [1 j], [1 -1], [1 -j] for 8, 9, 10, 11) | $\frac{1}{\sqrt{2}}[0\ 0\ 0\ 0\ a\ b\ 0\ 0]^t$ |
| 12-15 ([a b] = [1 1], [1 j], [1 -1], [1 -j] for 12, 13, 14, 15) | $\frac{1}{\sqrt{2}}[0\ 0\ 0\ 0\ 0\ 0\ a\ b]^t$ |

Similarly, example indication table for 1-layer CSI reporting according to Method 4 can be found in Table 35.

TABLE 35

Precoder indication using the 4-bit field for 1-layer CSI reporting (Method 4)

| Reported value for the new PMI | Precoder matrix W(i) |
|---|---|
| 0 | $\frac{1}{\sqrt{2}}[1\ 0\ 0\ 0\ 1\ 0\ 0\ 0]^t$ |
| 1 | $\frac{1}{\sqrt{2}}[1\ 0\ 0\ 0\ j\ 0\ 0\ 0]^t$ |
| 2 | $\frac{1}{\sqrt{2}}[1\ 0\ 0\ 0\ -1\ 0\ 0\ 0]^t$ |
| 3 | $\frac{1}{\sqrt{2}}[1\ 0\ 0\ 0\ -j\ 0\ 0\ 0]^t$ |
| 4-7 ([a b] = [1 1], [1 j], [1 -1], [1 -j] for 4, 5, 6, 7) | $\frac{1}{\sqrt{2}}[0\ a\ 0\ 0\ 0\ b\ 0\ 0]^t$ |
| 8-11 ([a b] = [1 1], [1 j], [1 -1], [1 -j] for 8, 9, 10, 11) | $\frac{1}{\sqrt{2}}[0\ 0\ a\ 0\ 0\ 0\ b\ 0]^t$ |
| 12-15 ([a b] = [1 1], [1 j], [1 -1], [1 -j] for 12, 13, 14, 15) | $\frac{1}{\sqrt{2}}[0\ 0\ 0\ a\ 0\ 0\ 0\ b]^t$ |

For 2-layer CSI reporting a 4-bit PMI is used. Example indication table for 2-layer CSI reporting according to Method 3 can be found in Table 36.

TABLE 36

Precoder indication using the 4-bit field for 2-layer CSI reporting (Method 3)

| Reported value for the new PMI | Precoder matrix W(i) |
|---|---|
| 0 | $\frac{1}{2}\begin{bmatrix}1 & 1 & 0 & 0 & 0 & 0 & 0 & 0\\1 & -1 & 0 & 0 & 0 & 0 & 0 & 0\end{bmatrix}^t$ |
| 1 | $\frac{1}{2}\begin{bmatrix}1 & j & 0 & 0 & 0 & 0 & 0 & 0\\1 & -j & 0 & 0 & 0 & 0 & 0 & 0\end{bmatrix}^t$ |
| 2, 3 (a = 1 for PMI 2; a = j for PMI 3) | $\frac{1}{2}\begin{bmatrix}0 & 0 & 1 & a & 0 & 0 & 0 & 0\\0 & 0 & 1 & -a & 0 & 0 & 0 & 0\end{bmatrix}^t$ |
| 4, 5 (a = 1 for PMI 4; a = j for PMI 5) | $\frac{1}{2}\begin{bmatrix}0 & 0 & 0 & 0 & 1 & a & 0 & 0\\0 & 0 & 0 & 0 & 1 & -a & 0 & 0\end{bmatrix}^t$ |
| 6, 7 (a = 1 for PMI 6; a = j for PMI 7) | $\frac{1}{2}\begin{bmatrix}0 & 0 & 0 & 0 & 0 & 0 & 1 & a\\0 & 0 & 0 & 0 & 0 & 0 & 1 & -a\end{bmatrix}^t$ |
| 8, 9 (a = 1 for PMI 8; a = j for PMI 9) | $\frac{1}{2}\begin{bmatrix}1 & a & 0 & 0 & 0 & 0 & 0 & 0\\0 & 0 & 1 & -a & 0 & 0 & 0 & 0\end{bmatrix}^t$ |
| 10, 11 (a = 1 for PMI 10; a = j for PMI 11) | $\frac{1}{2}\begin{bmatrix}0 & 0 & 1 & a & 0 & 0 & 0 & 0\\0 & 0 & 0 & 0 & 1 & -a & 0 & 0\end{bmatrix}^t$ |
| 12, 13 (a = 1 for PMI 12; a = j for PMI 13) | $\frac{1}{2}\begin{bmatrix}1 & a & 0 & 0 & 0 & 0 & 0 & 0\\0 & 0 & 0 & 0 & 0 & 0 & 1 & -a\end{bmatrix}^t$ |
| 14, 15 (a = 1 for PMI 14; a = j for PMI 15) | $\frac{1}{2}\begin{bmatrix}0 & 0 & 1 & a & 0 & 0 & 0 & 0\\0 & 0 & 0 & 0 & 0 & 0 & 1 & -a\end{bmatrix}^t$ |

For 2-layer CSI reporting a 4-bit PMI is used. Example indication table for 2-layer CSI reporting according to Method 4 can be found in Table 37.

TABLE 37

Precoder indication using the 4-bit field for 2-layer CSI reporting (Method 4)

| Reported value for the new PMI | Precoder matrix W(i) |
|---|---|
| 0 | $\frac{1}{2}\begin{bmatrix}1 & 0 & 0 & 0 & 1 & 0 & 0 & 0\\1 & 0 & 0 & 0 & -1 & 0 & 0 & 0\end{bmatrix}^t$ |
| 1 | $\frac{1}{2}\begin{bmatrix}1 & 0 & 0 & 0 & j & 0 & 0 & 0\\1 & 0 & 0 & 0 & -j & 0 & 0 & 0\end{bmatrix}^t$ |
| 2, 3 (a = 1 for PMI 2; a = j for PMI 3) | $\frac{1}{2}\begin{bmatrix}0 & 1 & 0 & 0 & 0 & a & 0 & 0\\0 & 1 & 0 & 0 & 0 & -a & 0 & 0\end{bmatrix}^t$ |
| 4, 5 (a = 1 for PMI 4; a = j for PMI 5) | $\frac{1}{2}\begin{bmatrix}0 & 0 & 1 & 0 & 0 & 0 & a & 0\\0 & 0 & 1 & 0 & 0 & 0 & -a & 0\end{bmatrix}^t$ |
| 6, 7 (a = 1 for PMI 6; a = j for PMI 7) | $\frac{1}{2}\begin{bmatrix}0 & 0 & 0 & 1 & 0 & 0 & 0 & a\\0 & 0 & 0 & 1 & 0 & 0 & 0 & -a\end{bmatrix}^t$ |
| 8, 9 (a = 1 for PMI 8; a = j for PMI 9) | $\frac{1}{2}\begin{bmatrix}1 & 0 & 0 & 0 & a & 0 & 0 & 0\\0 & 1 & 0 & 0 & 0 & -a & 0 & 0\end{bmatrix}^t$ |

TABLE 37-continued

Precoder indication using the 4-bit field for 2-layer CSI reporting (Method 4)

| Reported value for the new PMI | Precoder matrix W(i) |
|---|---|
| 10, 11 (a = 1 for PMI 10; a = j for PMI 11) | $\frac{1}{2}\begin{bmatrix} 0 & 1 & 0 & 0 & 0 & a & 0 & 0 \\ 0 & 0 & 1 & 0 & 0 & 0 & -a & 0 \end{bmatrix}^t$ |
| 12, 13 (a = 1 for PMI 12; a = j for PMI 13) | $\frac{1}{2}\begin{bmatrix} 1 & 0 & 0 & 0 & a & 0 & 0 & 0 \\ 0 & 0 & 0 & 1 & 0 & 0 & 0 & -a \end{bmatrix}^t$ |
| 14, 15 (a = 1 for PMI 14; a = j for PMI 15) | $\frac{1}{2}\begin{bmatrix} 0 & 1 & 0 & 0 & 0 & a & 0 & 0 \\ 0 & 0 & 0 & 1 & 0 & 0 & 0 & -a \end{bmatrix}^t$ |

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE) capable of communicating with a base station (BS), the UE comprising:
   a transceiver configured to receive a signal comprising a channel state information (CSI) process configuration, wherein the CSI process configuration comprises a CSI reference signal (CSI-RS) resource configuration to identify a CSI-RS resource and a CSI-RS on the CSI-RS resource; and
   a controller configured to derive a precoding matrix indicator utilizing the CSI-RS,
   wherein the transceiver is further configured to transmit the derived precoding matrix indicator to the base station, and
   wherein when the CSI-RS resource configuration indicates 4 CSI-RS ports:
      the precoding matrix indicator has a 3-bit size when a rank to derive the precoding matrix indicator is one (1),
      the precoding matrix indicator has a 3-bit size when the rank is two (2),
      the precoding matrix indicator has a 2-bit size when the rank is three (3), and
      the precoding matrix indicator has a 1-bit size when the rank is four (4), and
   wherein when the CSI-RS resource configuration indicates 8 CSI-RS ports:
      the precoding matrix indicator has a 4-bit size when the rank to derive the precoding matrix indicator is one (1), and
      the precoding matrix indicator has a 4-bit size when the rank is two (2).

2. The UE of claim 1, wherein when the CSI-RS resource configuration indicates 4 CSI-RS ports and the rank of CSI-RS is one (1), the 3-bit precoding matrix indicator comprises 8 indexes, each of 8 indexes being mapped to respective one matrix of a set of:

$$\left\{\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix}, \frac{1}{\sqrt{2}}\begin{bmatrix}0\\1\\0\\1\end{bmatrix}, \frac{1}{\sqrt{2}}\begin{bmatrix}0\\1\\0\\-1\end{bmatrix}, \frac{1}{\sqrt{2}}\begin{bmatrix}0\\1\\0\\j\end{bmatrix}, \frac{1}{\sqrt{2}}\begin{bmatrix}0\\1\\0\\-j\end{bmatrix}\right\}.$$

3. The UE of claim 1, wherein when the CSI-RS resource configuration indicates 8 CSI-RS ports and the rank of CSI-RS is one (1), the 4-bit precoding matrix indicator comprises 16 indexes, each of 16 indexes being mapped to respective one matrix of a set of:

$$\left\{\frac{1}{\sqrt{2}}[1\ 0\ 0\ 0\ 1\ 0\ 0\ 0]^t,\right.$$
$$\frac{1}{\sqrt{2}}[1\ 0\ 0\ 0\ -1\ 0\ 0\ 0]^t,$$
$$\frac{1}{\sqrt{2}}[1\ 0\ 0\ 0\ j\ 0\ 0\ 0]^t,$$
$$\frac{1}{\sqrt{2}}[1\ 0\ 0\ 0\ -j\ 0\ 0\ 0]^t,$$
$$\frac{1}{\sqrt{2}}[0\ 1\ 0\ 0\ 0\ 1\ 0\ 0]^t,$$
$$\frac{1}{\sqrt{2}}[0\ 1\ 0\ 0\ 0\ -1\ 0\ 0]^t,$$
$$\frac{1}{\sqrt{2}}[0\ 1\ 0\ 0\ 0\ j\ 0\ 0]^t,$$
$$\frac{1}{\sqrt{2}}[0\ 1\ 0\ 0\ 0\ -j\ 0\ 0]^t,$$
$$\frac{1}{\sqrt{2}}[0\ 0\ 1\ 0\ 0\ 0\ 1\ 0]^t,$$
$$\frac{1}{\sqrt{2}}[0\ 0\ 1\ 0\ 0\ 0\ -1\ 0]^t,$$
$$\frac{1}{\sqrt{2}}[0\ 0\ 1\ 0\ 0\ 0\ j\ 0]^t,$$
$$\frac{1}{\sqrt{2}}[0\ 0\ 1\ 0\ 0\ 0\ -j\ 0]^t,$$
$$\frac{1}{\sqrt{2}}[0\ 0\ 0\ 1\ 0\ 0\ 0\ 1]^t,$$
$$\frac{1}{\sqrt{2}}[0\ 0\ 0\ 1\ 0\ 0\ 0\ -1]^t,$$
$$\frac{1}{\sqrt{2}}[0\ 0\ 0\ 1\ 0\ 0\ 0\ j]^t,$$
$$\left.\frac{1}{\sqrt{2}}[0\ 0\ 0\ 1\ 0\ 0\ 0\ -j]^t,\right\}$$

4. The UE of claim 1, wherein when the CSI-RS resource configuration indicates 8 CSI-RS ports and the rank of CSI-RS is two (2), the 4-bit precoding matrix indicator comprises 16 indexes, each of 16 indexes being mapped to respective one matrix of a set of:

$$\left\{ \frac{1}{2}\begin{bmatrix} 1 & 0 & 0 & 0 & 1 & 0 & 0 & 0 \\ 1 & 0 & 0 & 0 & -1 & 0 & 0 & 0 \end{bmatrix}^t, \right.$$
$$\frac{1}{2}\begin{bmatrix} 1 & 0 & 0 & 0 & j & 0 & 0 & 0 \\ 1 & 0 & 0 & 0 & -j & 0 & 0 & 0 \end{bmatrix}^t,$$
$$\frac{1}{2}\begin{bmatrix} 0 & 1 & 0 & 0 & 0 & 1 & 0 & 0 \\ 0 & 1 & 0 & 0 & 0 & -1 & 0 & 0 \end{bmatrix}^t,$$
$$\frac{1}{2}\begin{bmatrix} 0 & 1 & 0 & 0 & 0 & j & 0 & 0 \\ 0 & 1 & 0 & 0 & 0 & -j & 0 & 0 \end{bmatrix}^t,$$
$$\frac{1}{2}\begin{bmatrix} 0 & 0 & 1 & 0 & 0 & 0 & 1 & 0 \\ 0 & 0 & 1 & 0 & 0 & 0 & -1 & 0 \end{bmatrix}^t,$$
$$\frac{1}{2}\begin{bmatrix} 0 & 0 & 1 & 0 & 0 & 0 & j & 0 \\ 0 & 0 & 1 & 0 & 0 & 0 & -j & 0 \end{bmatrix}^t,$$
$$\frac{1}{2}\begin{bmatrix} 0 & 0 & 0 & 1 & 0 & 0 & 0 & 1 \\ 0 & 0 & 0 & 1 & 0 & 0 & 0 & -1 \end{bmatrix}^t,$$
$$\frac{1}{2}\begin{bmatrix} 0 & 0 & 0 & 1 & 0 & 0 & 0 & j \\ 0 & 0 & 0 & j & 0 & 0 & 0 & -j \end{bmatrix}^t,$$
$$\frac{1}{2}\begin{bmatrix} 1 & 0 & 0 & 0 & 1 & 0 & 0 & 0 \\ 0 & 1 & 0 & 0 & 0 & -1 & 0 & 0 \end{bmatrix}^t,$$
$$\frac{1}{2}\begin{bmatrix} 1 & 0 & 0 & 0 & j & 0 & 0 & 0 \\ 0 & 1 & 0 & 0 & 0 & -j & 0 & 0 \end{bmatrix}^t,$$
$$\frac{1}{2}\begin{bmatrix} 0 & 1 & 0 & 0 & 0 & 1 & 0 & 0 \\ 0 & 0 & 1 & 0 & 0 & 0 & -1 & 0 \end{bmatrix}^t,$$
$$\frac{1}{2}\begin{bmatrix} 0 & 1 & 0 & 0 & 0 & j & 0 & 0 \\ 0 & 0 & 1 & 0 & 0 & 0 & -j & 0 \end{bmatrix}^t,$$
$$\frac{1}{2}\begin{bmatrix} 1 & 0 & 0 & 0 & 1 & 0 & 0 & 0 \\ 0 & 0 & 0 & 1 & 0 & 0 & 0 & -1 \end{bmatrix}^t,$$
$$\frac{1}{2}\begin{bmatrix} 1 & 0 & 0 & 0 & j & 0 & 0 & 0 \\ 0 & 0 & 0 & 1 & 0 & 0 & 0 & -j \end{bmatrix}^t,$$
$$\frac{1}{2}\begin{bmatrix} 0 & 1 & 0 & 0 & 1 & 0 & 0 & 0 \\ 0 & 0 & 0 & 1 & 0 & 0 & 0 & -1 \end{bmatrix}^t,$$
$$\left. \frac{1}{2}\begin{bmatrix} 0 & 1 & 0 & 0 & 0 & j & 0 & 0 \\ 0 & 0 & 0 & 1 & 0 & 0 & 0 & -j \end{bmatrix}^t \right\}$$

5. The UE of claim 1, wherein the CSI-RS resource configuration comprises at least one of a CSI-RS transmission period and offset, a parameter Pc, CSI-RS resource element (RE) mapping pattern indicator, or a number of antenna ports.

6. A base station capable of communicating with a user equipment (UE), the base station comprising:
  a transmitter configured to transmit a signal comprising a channel state information (CSI) process configuration, wherein the CSI process configuration comprises at least one CSI reference signal (CSI-RS) resource configuration to indicate a CSI-RS resource carrying a CSI-RS;
  a receiver configured to receive a CSI feedback comprising a precoding matrix indicator derived based on the CSI-RS carried on the CSI-RS resource,
  wherein when the CSI-RS resource configuration indicates 4 CSI-RS ports:
    the precoding matrix indicator has a 3-bit size when a rank to derive the precoding matrix indicator is one (1),
    the precoding matrix indicator has a 3-bit size when the rank is two (2),
    the precoding matrix indicator has a 2-bit size when the rank is three (3), and
    the precoding matrix indicator has a 1-bit size when the rank is four (4), and
  wherein when the CSI-RS resource configuration indicates 8 CSI-RS ports:
    the precoding matrix indicator has a 4-bit size when the rank to derive the precoding matrix indicator is one (1), and
    the precoding matrix indicator has a 4-bit size when the rank is two (2), and
  a controller configured to identify a precoder matrix according to a codebook based on the CSI feedback.

7. The base station of claim 6, wherein when the CSI-RS resource configuration indicates 4 CSI-RS ports and the rank of CSI-RS is one (1), the 3-bit precoding matrix indicator comprises 8 indexes, each of 8 indexes being mapped to respective one matrix of a set of:

$$\left\{ \frac{1}{\sqrt{2}}\begin{bmatrix} 1 \\ 0 \\ 1 \\ 0 \end{bmatrix}, \frac{1}{\sqrt{2}}\begin{bmatrix} 1 \\ 0 \\ -1 \\ 0 \end{bmatrix}, \frac{1}{\sqrt{2}}\begin{bmatrix} 1 \\ 0 \\ j \\ 0 \end{bmatrix}, \frac{1}{\sqrt{2}}\begin{bmatrix} 1 \\ 0 \\ -j \\ 0 \end{bmatrix}, \right.$$
$$\left. \frac{1}{\sqrt{2}}\begin{bmatrix} 0 \\ 1 \\ 0 \\ 1 \end{bmatrix}, \frac{1}{\sqrt{2}}\begin{bmatrix} 0 \\ 1 \\ 0 \\ -1 \end{bmatrix}, \frac{1}{\sqrt{2}}\begin{bmatrix} 0 \\ 1 \\ 0 \\ j \end{bmatrix}, \frac{1}{\sqrt{2}}\begin{bmatrix} 0 \\ 1 \\ 0 \\ -j \end{bmatrix} \right\}.$$

8. The base station of claim 6, wherein when the CSI-RS resource configuration indicates 8 CSI-RS ports and the rank of CSI-RS is one (1), the 4-bit precoding matrix indicator comprises 16 indexes, each of 16 indexes being mapped to respective one matrix of a set of:

$$\left\{ \frac{1}{\sqrt{2}}[1\ 0\ 0\ 0\ 1\ 0\ 0\ 0]^t, \right.$$
$$\frac{1}{\sqrt{2}}[1\ 0\ 0\ 0\ -1\ 0\ 0\ 0]^t,$$
$$\frac{1}{\sqrt{2}}[1\ 0\ 0\ 0\ j\ 0\ 0\ 0]^t,$$
$$\frac{1}{\sqrt{2}}[1\ 0\ 0\ 0\ -j\ 0\ 0\ 0]^t,$$
$$\frac{1}{\sqrt{2}}[0\ 1\ 0\ 0\ 0\ 1\ 0\ 0]^t,$$
$$\frac{1}{\sqrt{2}}[0\ 1\ 0\ 0\ 0\ -1\ 0\ 0]^t,$$
$$\frac{1}{\sqrt{2}}[0\ 1\ 0\ 0\ 0\ j\ 0\ 0]^t,$$
$$\frac{1}{\sqrt{2}}[0\ 1\ 0\ 0\ 0\ -j\ 0\ 0]^t,$$
$$\frac{1}{\sqrt{2}}[0\ 0\ 1\ 0\ 0\ 0\ 1\ 0]^t,$$
$$\frac{1}{\sqrt{2}}[0\ 0\ 1\ 0\ 0\ 0\ -1\ 0]^t,$$
$$\frac{1}{\sqrt{2}}[0\ 0\ 1\ 0\ 0\ 0\ j\ 0]^t,$$

-continued $$\frac{1}{\sqrt{2}}[0\ 0\ 1\ 0\ 0\ 0\ -j\ 0]^t,$$

$$\frac{1}{\sqrt{2}}[0\ 0\ 0\ 1\ 0\ 0\ 0\ 1]^t,$$

$$\frac{1}{\sqrt{2}}[0\ 0\ 0\ 1\ 0\ 0\ 0\ -1]^t,$$

$$\frac{1}{\sqrt{2}}[0\ 0\ 0\ 1\ 0\ 0\ 0\ j]^t,$$

$$\left.\frac{1}{\sqrt{2}}[0\ 0\ 0\ 1\ 0\ 0\ 0\ -j]^t,\right\}$$

9. The base station of claim 6, wherein the CSI-RS resource configuration indicates 8 CSI-RS ports and when the rank of CSI-RS is two (2), the 4-bit precoding matrix indicator comprises 16 indexes, each of 16 indexes being mapped to respective one matrix of a set of:

$$\left\{\frac{1}{2}\begin{bmatrix}1&0&0&0&1&0&0&0\\1&0&0&0&-1&0&0&0\end{bmatrix}^t,\right.$$

$$\frac{1}{2}\begin{bmatrix}1&0&0&0&j&0&0&0\\1&0&0&0&-j&0&0&0\end{bmatrix}^t,$$

$$\frac{1}{2}\begin{bmatrix}0&1&0&0&0&1&0&0\\0&1&0&0&0&-1&0&0\end{bmatrix}^t,$$

$$\frac{1}{2}\begin{bmatrix}0&1&0&0&0&j&0&0\\0&1&0&0&0&-j&0&0\end{bmatrix}^t,$$

$$\frac{1}{2}\begin{bmatrix}0&0&1&0&0&0&1&0\\0&0&1&0&0&0&-1&0\end{bmatrix}^t,$$

$$\frac{1}{2}\begin{bmatrix}0&0&1&0&0&0&j&0\\0&0&1&0&0&0&-j&0\end{bmatrix}^t,$$

$$\frac{1}{2}\begin{bmatrix}0&0&0&1&0&0&0&1\\0&0&0&1&0&0&0&-1\end{bmatrix}^t,$$

$$\frac{1}{2}\begin{bmatrix}0&0&0&1&0&0&0&j\\0&0&0&j&0&0&0&-j\end{bmatrix}^t,$$

$$\frac{1}{2}\begin{bmatrix}1&0&0&0&1&0&0&0\\0&1&0&0&0&-1&0&0\end{bmatrix}^t,$$

$$\frac{1}{2}\begin{bmatrix}1&0&0&0&j&0&0&0\\0&1&0&0&0&-j&0&0\end{bmatrix}^t,$$

$$\frac{1}{2}\begin{bmatrix}0&1&0&0&1&0&0&0\\0&0&1&0&0&-1&0&0\end{bmatrix}^t,$$

$$\frac{1}{2}\begin{bmatrix}0&1&0&0&j&0&0&0\\0&0&1&0&0&-j&0&0\end{bmatrix}^t,$$

$$\frac{1}{2}\begin{bmatrix}1&0&0&0&1&0&0&0\\0&0&0&1&0&0&0&-1\end{bmatrix}^t,$$

$$\frac{1}{2}\begin{bmatrix}1&0&0&0&j&0&0&0\\0&0&0&1&0&0&0&-j\end{bmatrix}^t,$$

$$\frac{1}{2}\begin{bmatrix}0&1&0&0&1&0&0&0\\0&0&0&1&0&0&0&-1\end{bmatrix}^t,$$

$$\left.\frac{1}{2}\begin{bmatrix}0&1&0&0&j&0&0&0\\0&0&0&1&0&0&0&-j\end{bmatrix}^t\right\}$$

10. The base station of claim 6, wherein the CSI-RS resource configuration comprises at least one of a CSI-RS transmission period and offset, a parameter Pc, CSI-RS resource element (RE) mapping pattern indicator, or a number of antenna ports.

11. A method for communicating with a base station (BS), the method comprising:
receiving a signal comprising a channel state information (CSI) process configuration, wherein the CSI process configuration comprises a CSI-RS resource configuration to identify a CSI-RS resource and a CSI-RS on the CSI-RS resource; and
deriving a precoding matrix indicator utilizing the CSI-RS,
wherein when the CSI-RS resource configuration indicates 4 CSI-RS ports:
the precoding matrix indicator has a 3-bit size when a rank to derive the precoding matrix indicator is one (1),
the precoding matrix indicator has a 3-bit size when the rank is two (2),
the precoding matrix indicator has a 2-bit size when the rank is three (3), and
the precoding matrix indicator has a 1-bit size when the rank of CSI-RS is four (4), and
wherein when the CSI-RS resource configuration indicates 8 CSI-RS ports:
the precoding matrix indicator has a 4-bit size when the rank to derive the precoding matrix indicator is one (1), and
the precoding matrix indicator has a 4-bit size when the rank is two (2); and
transmitting a precoding matrix indicator to the BS.

12. The method of claim 11, wherein when the CSI-RS resource configuration indicates 4 CSI-RS ports and the rank of CSI-RS is one (1), the 3-bit precoding matrix indicator comprises 8 indexes, each of 8 indexes being mapped to respective one matrix of a set of:

$$\left\{\frac{1}{\sqrt{2}}\begin{bmatrix}1\\0\\1\\0\end{bmatrix},\frac{1}{\sqrt{2}}\begin{bmatrix}1\\0\\-1\\0\end{bmatrix},\frac{1}{\sqrt{2}}\begin{bmatrix}1\\0\\j\\0\end{bmatrix},\frac{1}{\sqrt{2}}\begin{bmatrix}1\\0\\-j\\0\end{bmatrix},\right.$$

$$\left.\frac{1}{\sqrt{2}}\begin{bmatrix}0\\1\\0\\1\end{bmatrix},\frac{1}{\sqrt{2}}\begin{bmatrix}0\\1\\0\\-1\end{bmatrix},\frac{1}{\sqrt{2}}\begin{bmatrix}0\\1\\0\\j\end{bmatrix},\frac{1}{\sqrt{2}}\begin{bmatrix}0\\1\\0\\-j\end{bmatrix}\right\}.$$

13. The method of claim 11, wherein when the CSI-RS resource configuration indicates 8 CSI-RS ports and the rank of CSI-RS is one (1), the 4-bit precoding matrix indicator comprises 16 indexes, each of 16 indexes being mapped to respective one matrix of a set of:

$$\left\{\frac{1}{\sqrt{2}}[1\ 0\ 0\ 0\ 1\ 0\ 0\ 0]^t,\right.$$

$$\frac{1}{\sqrt{2}}[1\ 0\ 0\ 0\ -1\ 0\ 0\ 0]^t,$$

$$\frac{1}{\sqrt{2}}[1\ 0\ 0\ 0\ j\ 0\ 0\ 0]^t,$$

$$\frac{1}{\sqrt{2}}[1\ 0\ 0\ 0\ -j\ 0\ 0\ 0]^t,$$

-continued $$\frac{1}{\sqrt{2}}[0\ 1\ 0\ 0\ 0\ 1\ 0\ 0]^t,$$

$$\frac{1}{\sqrt{2}}[0\ 1\ 0\ 0\ 0\ -1\ 0\ 0]^t,$$

$$\frac{1}{\sqrt{2}}[0\ 1\ 0\ 0\ 0\ j\ 0\ 0]^t,$$

$$\frac{1}{\sqrt{2}}[0\ 1\ 0\ 0\ 0\ -j\ 0\ 0]^t,$$

$$\frac{1}{\sqrt{2}}[0\ 0\ 1\ 0\ 0\ 0\ 1\ 0]^t,$$

$$\frac{1}{\sqrt{2}}[0\ 0\ 1\ 0\ 0\ 0\ -1\ 0]^t,$$

$$\frac{1}{\sqrt{2}}[0\ 0\ 1\ 0\ 0\ 0\ j\ 0]^t,$$

$$\frac{1}{\sqrt{2}}[0\ 0\ 1\ 0\ 0\ 0\ -j\ 0]^t,$$

$$\frac{1}{\sqrt{2}}[0\ 0\ 0\ 1\ 0\ 0\ 0\ 1]^t,$$

$$\frac{1}{\sqrt{2}}[0\ 0\ 0\ 1\ 0\ 0\ 0\ -1]^t,$$

$$\frac{1}{\sqrt{2}}[0\ 0\ 0\ 1\ 0\ 0\ 0\ j]^t,$$

$$\left.\frac{1}{\sqrt{2}}[0\ 0\ 0\ 1\ 0\ 0\ 0\ -j]^t\right\}.$$

14. The method of claim 11, wherein when the CSI-RS resource configuration indicates 8 CSI-RS ports and the rank of CSI-RS is two (2), the 4-bit precoding matrix indicator comprises 16 indexes, each of 16 indexes being mapped to respective one matrix of a set of:

$$\left\{\frac{1}{2}\begin{bmatrix}1&0&0&0&1&0&0&0\\1&0&0&0&-1&0&0&0\end{bmatrix}^t,\right.$$

$$\frac{1}{2}\begin{bmatrix}1&0&0&0&j&0&0&0\\1&0&0&0&-j&0&0&0\end{bmatrix}^t,$$

$$\frac{1}{2}\begin{bmatrix}0&1&0&0&0&1&0&0\\0&1&0&0&0&-1&0&0\end{bmatrix}^t,$$

$$\frac{1}{2}\begin{bmatrix}0&1&0&0&0&j&0&0\\0&1&0&0&0&-j&0&0\end{bmatrix}^t,$$

$$\frac{1}{2}\begin{bmatrix}0&0&1&0&0&0&1&0\\0&0&1&0&0&0&-1&0\end{bmatrix}^t,$$

$$\frac{1}{2}\begin{bmatrix}0&0&1&0&0&0&j&0\\0&0&1&0&0&0&-j&0\end{bmatrix}^t,$$

$$\frac{1}{2}\begin{bmatrix}0&0&0&1&0&0&0&1\\0&0&0&1&0&0&0&-1\end{bmatrix}^t,$$

$$\frac{1}{2}\begin{bmatrix}0&0&0&1&0&0&0&j\\0&0&0&j&0&0&0&-j\end{bmatrix}^t,$$

$$\frac{1}{2}\begin{bmatrix}1&0&0&0&1&0&0&0\\0&1&0&0&0&-1&0&0\end{bmatrix}^t,$$

$$\frac{1}{2}\begin{bmatrix}1&0&0&0&j&0&0&0\\0&1&0&0&0&-j&0&0\end{bmatrix}^t,$$

$$\frac{1}{2}\begin{bmatrix}0&1&0&0&1&0&0&0\\0&0&1&0&0&0&-1&0\end{bmatrix}^t,$$

$$\frac{1}{2}\begin{bmatrix}0&1&0&0&j&0&0&0\\0&0&1&0&0&0&-j&0\end{bmatrix}^t,$$

$$\frac{1}{2}\begin{bmatrix}1&0&0&0&1&0&0&0\\0&0&0&1&0&0&0&-1\end{bmatrix}^t,$$

$$\frac{1}{2}\begin{bmatrix}1&0&0&0&j&0&0&0\\0&0&0&1&0&0&0&-j\end{bmatrix}^t,$$

$$\frac{1}{2}\begin{bmatrix}0&1&0&0&0&1&0&0\\0&0&0&1&0&0&0&-1\end{bmatrix}^t,$$

$$\left.\frac{1}{2}\begin{bmatrix}0&1&0&0&0&j&0&0\\0&0&0&1&0&0&0&-j\end{bmatrix}^t\right\}.$$

15. The method of claim 11, wherein the CSI-RS resource configuration comprises at least one of a CSI-RS transmission period and offset, a parameter Pc, CSI-RS resource element (RE) mapping pattern indicator, or a number of antenna ports.

16. A method for communicating with a user equipment (UE), the method comprising:
transmitting a signal comprising a channel state information (CSI) process configuration, wherein the CSI process configuration comprises a CSI-RS resource configuration to indicate a CSI-RS resource carrying a CSI-RS;
receiving a CSI feedback comprising a precoding matrix indicator derived based on the CSI-RS carried on the CSI-RS resource,
wherein when the CSI-RS resource configuration indicates 4 CSI-RS ports:
the precoding matrix indicator has a 3-bit size when a rank to derive the precoding matrix indicator is one (1),
the precoding matrix indicator has a 3-bit size when the rank is two (2),
the precoding matrix indicator has a 2-bit size when the rank is three (3), and
the precoding matrix indicator has a 1-bit size when the rank is four (4), and
wherein when the CSI-RS resource configuration indicates 8 CSI-RS ports:
the precoding matrix indicator has a 4-bit size when the rank to derive the precoding matrix indicator is one (1), and
the precoding matrix indicator has a 4-bit size when the rank is two (2); and identifying a precoder matrix according to a codebook based on the CSI feedback.

17. The method of claim 16, wherein the CSI-RS resource configuration indicates 4 CSI-RS ports and when the rank of CSI-RS is one (1), the 3-bit precoding matrix indicator comprises 8 indexes, each of 8 indexes being mapped to respective one matrix of a set of:

$$\left\{\frac{1}{\sqrt{2}}\begin{bmatrix}1\\0\\1\\0\end{bmatrix},\frac{1}{\sqrt{2}}\begin{bmatrix}1\\0\\-1\\0\end{bmatrix},\frac{1}{\sqrt{2}}\begin{bmatrix}1\\0\\j\\0\end{bmatrix},\frac{1}{\sqrt{2}}\begin{bmatrix}1\\0\\-j\\0\end{bmatrix},\right.$$

$$\left.\frac{1}{\sqrt{2}}\begin{bmatrix}0\\1\\0\\1\end{bmatrix},\frac{1}{\sqrt{2}}\begin{bmatrix}0\\1\\0\\-1\end{bmatrix},\frac{1}{\sqrt{2}}\begin{bmatrix}0\\1\\0\\j\end{bmatrix},\frac{1}{\sqrt{2}}\begin{bmatrix}0\\1\\0\\-j\end{bmatrix}\right\}.$$

18. The method of claim 16, wherein the CSI-RS resource configuration indicates 8 CSI-RS ports and when the rank of CSI-RS is one (1), the 4-bit precoding matrix indicator comprises 16 indexes, each of 16 indexes being mapped to respective one matrix of a set of:

$$\left\{\frac{1}{\sqrt{2}}[1\ 0\ 0\ 0\ 1\ 0\ 0\ 0]^t,\right.$$

$$\frac{1}{\sqrt{2}}[1\ 0\ 0\ 0\ -1\ 0\ 0\ 0]^t,$$

$$\frac{1}{\sqrt{2}}[1\ 0\ 0\ 0\ j\ 0\ 0\ 0]^t,$$

$$\frac{1}{\sqrt{2}}[1\ 0\ 0\ 0\ -j\ 0\ 0\ 0]^t,$$

$$\frac{1}{\sqrt{2}}[0\ 1\ 0\ 0\ 0\ 1\ 0\ 0]^t,$$

$$\frac{1}{\sqrt{2}}[0\ 1\ 0\ 0\ 0\ -1\ 0\ 0]^t,$$

$$\frac{1}{\sqrt{2}}[0\ 1\ 0\ 0\ 0\ j\ 0\ 0]^t,$$

$$\frac{1}{\sqrt{2}}[0\ 1\ 0\ 0\ 0\ -j\ 0\ 0]^t,$$

$$\frac{1}{\sqrt{2}}[0\ 0\ 1\ 0\ 0\ 0\ 1\ 0]^t,$$

$$\frac{1}{\sqrt{2}}[0\ 0\ 1\ 0\ 0\ 0\ -1\ 0]^t,$$

$$\frac{1}{\sqrt{2}}[0\ 0\ 1\ 0\ 0\ 0\ j\ 0]^t,$$

$$\frac{1}{\sqrt{2}}[0\ 0\ 1\ 0\ 0\ 0\ -j\ 0]^t,$$

$$\frac{1}{\sqrt{2}}[0\ 0\ 0\ 1\ 0\ 0\ 0\ 1]^t,$$

$$\frac{1}{\sqrt{2}}[0\ 0\ 0\ 1\ 0\ 0\ 0\ -1]^t,$$

$$\frac{1}{\sqrt{2}}[0\ 0\ 0\ 1\ 0\ 0\ 0\ j]^t,$$

$$\left.\frac{1}{\sqrt{2}}[0\ 0\ 0\ 1\ 0\ 0\ 0\ -j]^t,\right\}$$

19. The method of claim 16, wherein the CSI-RS resource configuration indicates 8 CSI-RS ports and when the rank of CSI-RS is two (2), the 4-bit precoding matrix indicator comprises 16 indexes, each of 4 indexes being mapped to respective one matrix of a set of:

$$\left\{\frac{1}{2}\begin{bmatrix}1 & 0 & 0 & 0 & 1 & 0 & 0 & 0\\ 1 & 0 & 0 & 0 & -1 & 0 & 0 & 0\end{bmatrix}^t,\right.$$

$$\frac{1}{2}\begin{bmatrix}1 & 0 & 0 & 0 & j & 0 & 0 & 0\\ 1 & 0 & 0 & 0 & -j & 0 & 0 & 0\end{bmatrix}^t,$$

$$\frac{1}{2}\begin{bmatrix}0 & 1 & 0 & 0 & 0 & 1 & 0 & 0\\ 0 & 1 & 0 & 0 & 0 & -1 & 0 & 0\end{bmatrix}^t,$$

$$\frac{1}{2}\begin{bmatrix}0 & 1 & 0 & 0 & 0 & j & 0 & 0\\ 0 & 1 & 0 & 0 & 0 & -j & 0 & 0\end{bmatrix}^t,$$

$$\frac{1}{2}\begin{bmatrix}0 & 0 & 1 & 0 & 0 & 0 & 1 & 0\\ 0 & 0 & 1 & 0 & 0 & 0 & -1 & 0\end{bmatrix}^t,$$

$$\frac{1}{2}\begin{bmatrix}0 & 0 & 1 & 0 & 0 & 0 & j & 0\\ 0 & 0 & 1 & 0 & 0 & 0 & -j & 0\end{bmatrix}^t,$$

$$\frac{1}{2}\begin{bmatrix}0 & 0 & 0 & 1 & 0 & 0 & 0 & 1\\ 0 & 0 & 0 & 1 & 0 & 0 & 0 & -1\end{bmatrix}^t,$$

$$\frac{1}{2}\begin{bmatrix}0 & 0 & 0 & 1 & 0 & 0 & 0 & j\\ 0 & 0 & 0 & j & 0 & 0 & 0 & -j\end{bmatrix}^t,$$

$$\frac{1}{2}\begin{bmatrix}1 & 0 & 0 & 0 & 1 & 0 & 0 & 0\\ 0 & 1 & 0 & 0 & 0 & -1 & 0 & 0\end{bmatrix}^t,$$

$$\frac{1}{2}\begin{bmatrix}1 & 0 & 0 & 0 & j & 0 & 0 & 0\\ 0 & 1 & 0 & 0 & 0 & -j & 0 & 0\end{bmatrix}^t,$$

$$\frac{1}{2}\begin{bmatrix}0 & 1 & 0 & 0 & 0 & 1 & 0 & 0\\ 0 & 0 & 1 & 0 & 0 & 0 & -1 & 0\end{bmatrix}^t,$$

$$\frac{1}{2}\begin{bmatrix}0 & 1 & 0 & 0 & 0 & j & 0 & 0\\ 0 & 0 & 1 & 0 & 0 & 0 & -j & 0\end{bmatrix}^t,$$

$$\frac{1}{2}\begin{bmatrix}1 & 0 & 0 & 0 & 1 & 0 & 0 & 0\\ 0 & 0 & 0 & 1 & 0 & 0 & 0 & -1\end{bmatrix}^t,$$

$$\frac{1}{2}\begin{bmatrix}1 & 0 & 0 & 0 & j & 0 & 0 & 0\\ 0 & 0 & 0 & 1 & 0 & 0 & 0 & -j\end{bmatrix}^t,$$

$$\frac{1}{2}\begin{bmatrix}0 & 1 & 0 & 0 & 0 & 1 & 0 & 0\\ 0 & 0 & 0 & 1 & 0 & 0 & 0 & -1\end{bmatrix}^t,$$

$$\left.\frac{1}{2}\begin{bmatrix}0 & 1 & 0 & 0 & 0 & j & 0 & 0\\ 0 & 0 & 0 & 1 & 0 & 0 & 0 & -j\end{bmatrix}^t,\right\}$$

20. The method of claim 16, wherein the CSI-RS resource configuration comprises at least one of a CSI-RS transmission period and offset, a parameter Pc, CSI-RS resource element (RE) mapping pattern indicator, or a number of antenna ports.

* * * * *